United States Patent [19]

Kawakami et al.

[11] Patent Number: 5,733,498
[45] Date of Patent: Mar. 31, 1998

[54] METHOD FOR PRODUCING SILICON NITRIDE REACTION-SINTERED BODY

[75] Inventors: Yasunobu Kawakami, Higashimurayama; Kazumi Miyake, Asaka; Hitoshi Toyoda, Niiza; Naoki Ota, Saitama-ken; Kagehisa Hamazaki, Asaka, all of Japan

[73] Assignee: Honda Giken Kogyo Kabushiki Kaisha, Tokyo, Japan

[21] Appl. No.: 650,553

[22] Filed: May 20, 1996

Related U.S. Application Data

[63] Continuation of Ser. No. 202,490, Feb. 28, 1994, abandoned.

[51] Int. Cl.$^6$ .................. C04B 33/32; B28B 1/24
[52] U.S. Cl. .................. 264/645; 264/656; 264/657; 264/658; 264/673
[58] Field of Search .................. 264/57, 65, 66, 264/645, 656, 657, 658, 669, 670, 673; 501/97

[56] References Cited

U.S. PATENT DOCUMENTS

| | | | |
|---|---|---|---|
| 4,701,106 | 10/1987 | Sasaki | 264/262 |
| 4,713,206 | 12/1987 | Matsuhisa et al. | 264/328.2 |
| 5,055,432 | 10/1991 | Edler et al. | 501/97 |
| 5,126,294 | 6/1992 | Hirosaki et al. | 501/97 |

FOREIGN PATENT DOCUMENTS

| | | |
|---|---|---|
| 0140076 | 5/1985 | European Pat. Off. . |
| 2559762 | 8/1985 | France . |
| 3007374 | 9/1980 | Germany . |
| 472586 | 2/1972 | Japan . |
| 4-952205 | 5/1974 | Japan . |
| 5-333208 | 3/1978 | Japan . |
| 54-160410 | 12/1979 | Japan . |
| 5-622678 | 3/1981 | Japan . |
| 5-884108 | 5/1983 | Japan . |
| 5-988374 | 5/1984 | Japan . |
| 60-171269 | 9/1985 | Japan . |
| 60-171273 | 9/1985 | Japan . |
| 60-171274 | 9/1985 | Japan . |
| 60-186473 | 9/1985 | Japan . |
| 61-227908 | 10/1986 | Japan . |
| 62-132775 | 6/1987 | Japan . |
| 62-148372 | 7/1987 | Japan . |
| 6-379763 | 4/1988 | Japan . |
| 1-261265 | 10/1989 | Japan . |
| 248468 | 2/1990 | Japan . |
| 224789 | 5/1990 | Japan . |
| 358802 | 3/1991 | Japan . |
| 3126505 | 5/1991 | Japan . |
| 2010915 | 7/1979 | United Kingdom . |
| 2059326 | 4/1981 | United Kingdom . |

*Primary Examiner*—Christopher A. Fiorilla
*Attorney, Agent, or Firm*—Birch, Stewart, Kolasch & Birch, L.L.P.

[57] ABSTRACT

A silicon nitride reaction-sintered body having a high mechanical strength without surface working can be produced by (1) forming a silicon powder mixture of at least two types of silicon powders having substantially independent particle size distribution ranges into a green body, the silicon powder mixture having an average particle size ranging from 5 μm to 300 μm; (2) heating the green body in a nitrogen-containing atmosphere for nitrogenation; and (3) sintering the nitrogenated green body at a temperature of 1900° C. or higher.

13 Claims, 20 Drawing Sheets

| 53% | 17% | 15% | 10% | 5% |
|---|---|---|---|---|
| Wax | Wax | Maleinized Wax | Stearic Acid | Dispersant |
| $W_1$ | $W_2$ | $W_3$ | $W_4$ | $W_5$ |

CONCENTRATION OF HYDROGEN (vol. %)

CONCENTRATION OF HYDROGEN (vol. %)

METHOD FOR PRODUCING SILICON NITRIDE REACTION-SINTERED BODY

This application is a continuation of application Ser. No. 08/202,490 filed on Feb. 28, 1994, now abandoned.

BACKGROUND OF THE INVENTION

The present invention relates to a silicon nitride reaction-sintered body, a method and an apparatus for producing the same, and more particularly to a silicon nitride reaction-sintered body having improved mechanical strength and toughness, a low sintering shrinkage and thus enhanced dimensional accuracy and stability and high as-sintered strength, and a method and an apparatus for producing the same.

It is known that a silicon nitride sintered body is usable as structural members for gas turbines, etc. which are exposed to severe conditions such as an elevated temperature, because of its excellent properties such as mechanical strength, heat resistance, thermal impact resistance, wear resistance, oxidation resistance, etc.

Such a silicon nitride ceramic body is generally produced by forming a mixture of a silicon nitride powder and a sintering aid into a green body which is then subjected to sintered. In general, a silicon nitride green body shrinks to some extent when sintered, and a shrinkage ratio is not uniform throughout the green body, failing to achieve a sufficient dimensional accuracy. Accordingly, a surface working is inevitable to achieve a sufficient dimensional accuracy of the sintered body. In addition, by the decomposition and evaporation of silicon nitride near a surface of the green body during sintering, surface roughing is likely to take place, failing to achieve a sufficient strength. Thus, the sintered silicon nitride ceramic product should finally be surface-worked.

However, there have been problems that such surface working is costly and not applicable to the ceramic bodies having complicated shapes. As a method for producing sintered silicon nitride ceramics free from such problems, there has been proposed a so-called reaction-sintering method in which a mixture of silicon powder and sintering aids are used as starting materials and formed or molded into a green body which is nitrogenated for the conversion of silicon to silicon nitride and then sintered. The reaction-sintering method has advantages that the nitrogenated green body suffers from only limited shrinkage by sintering so that the final sintered product has a relatively high dimensional accuracy and stability, and that the lower cost of raw materials leads to inexpensive production of engineering ceramic members usable in various industrial fields. Until now, a variety of reaction-sintering methods have been proposed.

Japanese Patent Laid-Open No. 47-2586 discloses a method in which a green body formed from silicon powder and a sintering aid is heated for nitrogenation in a nitrogen-containing atmosphere, and then subjected to sintering by hot pressing to provide a sintered body having a desired dimensional accuracy.

Japanese Patent Laid-Open No. 49-52205 discloses a method in which a green body prepared from silicon powder having a maximum particle size of 10 µm is sintered substantially in the absence of nitrogen, carbon and oxygen, and nitrogenated and sintered in a nitrogen-containing atmosphere so as to obtain a relatively non-porous sintered body having high density and strength and a lower content of $\alpha$-$Si_3N_4$.

Japanese Patent Laid-Open No. 53-33208 discloses a reaction-sintering method using a starting material composed primarily of silicon powder and containing as a sintering aid at least one powdery component of metal selected from the group consisting of Fe, Co, Ni, Mn, W, Mo, Ti, Al, Mg, Zr.

Japanese Patent Laid-Open No. 54-16410 discloses a method in which a mixture of silicon powder having a particle size of 1 µm to 44 µm and at least one sintering aid selected from the group consisting of MgO, $Y_2O_3$, $CeO_2$, $ZrO_2$, BeO, $Mg_3N_2$, AlN, MgSi, $MgAl_2O_4$, $La_2O_3$ and Fe is compression-molded to obtain a ceramic body having a density of 1.3 $g/cm^3$, which is then nitrogenated in a nitrogen-containing atmosphere at 1500° C. or lower and then sintered in a nitrogen atmosphere at 1500° C. or higher.

Japanese Patent Laid-Open No. 56-22678 discloses a method in which a mixture of silicon powder having a maximum particle size of 25 µm and a sintering aid is formed into a green body which is subjected to a reaction-sintering process in a nitrogen-containing atmosphere and then to a re-sintering process in a nitrogen-containing atmosphere at a temperature ranging from 1600° C. to 2200° C.

Japanese Patent Laid-Open No. 58-84108 discloses a method in which a mixture of silicon powder having a specific surface area of 0.5 $m^2/g$ or more and an average particle size of 2.58 µm or less and a sintering aid is nitrogenated at a temperature of 1250° C. to 1450° C.

Japanese Patent Laid-Open No. 59-88374 discloses a method employing a starting material composed of (a) silicon powder and (b) at least one sintering aid made of an oxide of a metal selected from the group consisting of Mg, Y, Cr, Mo, Fe, Mn, W, Co, V, U, Ni, Ti, Hf, Zr, Nb and Ta.

Japanese Patent Laid-Open No. 60-186473 discloses a method in which a mixture of silicon powder and a hydrocarbon compound is molded at 500°–1200° C. to form a green body which is nitrogenated at a temperature of 1200° C. or higher.

Japanese Patent Laid-Open No. 61-227908 discloses a method in which a mixture of silicon powder and an alloy powder of IIIa metals having an average particle size of 2 µm or less is formed into a green body which is nitrogenated at a temperature of 1300° C. to 1400° C. and then sintered at 1700° C. or higher.

Japanese Patent Publication No. 2-24789 discloses a method using as a starting material a mixture of silicon powder having a particle size of 2 µm or less, an oxide powder of a IIIa metal in the Periodic Table and $Al_2O_3$ powder, which is compressed to form a green body which is sintered in a non-oxidizing atmosphere at a temperature of 1750° C. to 1850° C.

Japanese Patent Laid-Open No. 2-48468 discloses a method in which a mixture of silicon powder and a large amount of a sintering aid such as MgO, $Al_2O_3$, $Y_2O_3$, etc. is subjected to a nitrogenation and sintering.

However, none of these prior art methods employ silicon powder having a large particle size, particularly a mixture of two or more silicon powders having different particle size distribution ranges, to attain a sintered body with high dimensional accuracy. Accordingly, green bodies made thereby do not have a high density, leading to large variations of diminution when sintered. Consequently, the resultant sintered bodies inevitably have poor dimensional accuracy, low density and insufficient strength.

In addition to the above-described problems, when a ceramic article with a complicated shape is to be produced, it is impossible to do a surface working on a sintered body. Accordingly, a green body having a "near net shape", namely substantially the same shape as that of the ceramic article, or its parts should be formed, and the final sintered ceramic article produced from such green body or from bonded parts should have sufficient strength. For this purpose, none of the above methods is satisfactory.

Further, in the case of a green body with a complicated shape, many steps are required for production thereof. Since it is actually difficult to form green bodies having the same shape as the complicated shape of the final ceramic product, separate parts for the green body each having a simpler shape should be formed and then bonded together to attain an integral green body. However, if the separate parts are abutted each other and sintered, the bonded portions would be likely to have a decreased strength. In order to overcome the deficiencies, there have been proposed various methods for preventing the deterioration of strength in the bonded portions.

Japanese Patent Application Laid-Open No. 60-171269 discloses a method in which separate parts of the green body are formed from a starting material of silicon powder and a solvent-insoluble resin, and then bonded together to prepare an integral body by contacting opposed surfaces thereof between which a bonding material composed of silicon powder and a resin is applied, heating the bonded bodies to polymerize the resin component in the bonding material and finally subjecting the bonded bodies to nitrogenation in a nitrogen-containing atmosphere at a temperature between 1200° C. to 1500° C.

Japanese Patent Laid-Open No. 60-171274 discloses a method of heat-treating separate green parts formed from a raw material of silicon powder having a particle size of 44 μm or less and a non-oxide ceramic material in a non-oxidizing atmosphere at a temperature of 600° C. to 1500° C. to prepare calcinated parts each containing 60–100 weight % of unreacted silicon powder, working a surface of each calcinated part to expose the unreacted silicon, bonding the calcinated parts to each other with a bonding material composed of silicon powder having a particle size of 44 μm or less and a resin interposed between the worked surfaces thereof, and finally sintering the bonded calcinated parts in an $N_2$ atmosphere at a temperature between 1200° C. and 1500° C.

Nevertheless, any of the above-described prior art methods fails to produce a sintered ceramic body having a sufficient bonding strength.

Further, it is known that a cold isostatic pressing (CIP) is suitably adopted as a molding method for the production of a silicon nitride green body. In the CIP method, two mold members are positioned in axially opposed and spaced relation, with a container made of an elastic material such as a rubber disposed therebetween. A ceramic powder is charged into the container which is then placed in a pressurized fluid to apply a molding pressure onto the container. After the application of the molding pressure, the pressurized fluid is withdrawn from the system to recover a green body from the container. In the conventional CIP method, there has occurred such an inconvenience that cracks are likely to be generated in diameter-decreasing portions of the resulting green bodies.

In order to overcome the problem, for instance, Japanese Patent Laid-Open No. 3-58802 discloses a method for producing a green body free from cracks by disposing two mold members, at least one of which is movable, at opposite ends of a cylindrical container made of a rubber, and applying a pressure to the container to displace the movable mold member in the axial direction, thereby preventing cracks from generating in the green body. However, this method necessitates the additional movable mold member, resulting in an increase in the number of components, requiring the provision of a complicated control mechanism for controlling a displacement of the movable mold member.

In addition, for instance, a cylindrical ceramic green body having different diameters at its opposite ends has been manufactured by the conventional method using a molding apparatus as shown in FIG. 5. The molding apparatus includes a first mold member 22 made of a metal and a second mold member 24 made of a rubber for defining a cavity 26 therebetween. With this cold isostatic pressing apparatus, a ceramic powder 27 is charged into the cavity 26, and the cavity 26 is closed with a third mold member 28 made of a metal. A hydraulic fluid pressure is isostatically applied to the second mold member 24 from the outside to obtain a compressed green body. The hydraulic fluid pressure causes the silicon powder to flow both in the axial and circumferential directions as shown in FIG. 6. However, upon reduction of the fluid pressure, an undesired stress is concentrated in a tapered portion 29 due to a so-called spring-back phenomenon of the green body, because the axial flow of the silicon powder in the molding apparatus is restricted by the first and second mold members 22 and 28 as shown in FIG. 6. As a result, the green body is likely to be broken at the tapered portion 29 as shown in FIG. 7.

Furthermore, the reaction-sintered body may be produced by an injection molding method. In this case, a starting material is prepared by adding a binder made of a thermoplastic resin, wax, a surfactant for improving dispersibility and flowability under heated condition, etc. to a mixture of silicon powder and a sintering aid. In this case, a choice of the binder is essential to reduce molding defects.

For example, Japanese Patent Laid-Open No. 1-261265 discloses that a binder containing 4 mg equivalent of a carboxyl group-containing polymer is suitably used for the injection molding of a green body having a complicated shape. However, the binder containing a carboxyl group-containing polymer exhibits a large change in volume upon solidification. As a result, there is a tendency to produce a green body with a non-uniform density which is likely to suffer from cracks in degreasing and sintering processes. Although the raw material described above is useful for a high-pressure injection molding at 100–2000 $kg/cm^2$, it is not suitable for a low-pressure injection molding at 2–10 $kg/cm^2$ due to its high viscosity. An increase in the viscosity is further accelerated by using fine silicon powder, resulting in decreased moldability.

A silicon nitride sintered body having a complicated shape cannot be produced with a single step. Therefore, a plurality of separate parts are usually formed and then bonded together for subsequent sintering. As such an article with a complicated shape which may be produced by a silicon nitride sintered body, there is a nozzle member for a turbine apparatus, in which a high-temperature compressed combustion gas is injected at a high rate to rotate a turbine rotor. FIGS. 14(a) and 14(b) show a nozzle member of such a type. A nozzle body portion 42 includes an outer nozzle member 44 and an inner nozzle member 46 concentrically disposed and bonded to each other via a plurality of nozzle vanes 48a–48h. In the production of such a nozzle member, these individual components are separately formed by a press. The formed inner nozzle member 46 is disposed within the formed outer nozzle member 44, and a binder resin is applied to opposite surfaces of the nozzle vanes 48a–48h which are then disposed between the outer and inner nozzle members 44 and 46 to bond them to each other. The green bodies thus combined are sintered to produce the nozzle member. In this regard, a reference is made to Japanese Patent Laid-Open Nos. 60-171273 and 60-171174.

In the sintering process, however, such a green body produced by combining the separate green body parts often suffers from cracks or ruptures at junctions of the outer nozzle member 44 to the nozzle vanes 48a–48h, resulting in the separation of the nozzle vanes 48a–48h from the outer nozzle member 44.

Japanese Patent Laid-Open No. 62-148372 discloses a method for producing a silicon nitride sintered body, in which a green body composed primarily of a silicon nitride is sintered in the presence of gaseous yttrium oxide ($Y_2O_3$) or a yttrium oxide powder to save the amount of the yttrium oxide as a sintering aid and to reduce a white porous layer which has been reported in the prior arts to be generated in a surface area of the sintered body, enabling the production of a sintered body having a relatively dense surface and high strength. This method of sintering in a yttrium oxide atmosphere is useful to obtain a sintered body having a relatively improved surface condition. In recent years, however, there is an increasingly higher demand of producing a sintered body without any need of post-treatment after sintering called as "near net shaping". Accordingly, further improvements of surface condition of the sintered body are desired to achieve an enhanced strength and to prevent surface roughness.

Japanese Patent Laid-Open No. 63-79763 discloses a method of accelerating the nitrogenation of silicon powder to silicon nitride by adding, to a nitrogen-containing atmosphere, a nitrogenation-accelerating gas containing at least gas selected from the group consisting of hydrogen, helium, ammonia, hydrogen sulfide and argon. Japanese Patent Laid-Open No. 62-132775 discloses a method of lowering the fluctuation of a nitrogenation degree by using a nitrogen gas containing 80–60 volume % of hydrogen. However, it has been found that the a gaseous mixture of $N_2/H_2$ in these methods does not successfully produce a sintered body with improved properties.

OBJECT AND SUMMARY OF THE INVENTION

Accordingly, an object of the present invention is to provide a method for producing a silicon nitride reaction-sintered body having improved mechanical strength and toughness, a low sintering shrinkage, and therefore enhanced dimensional accuracy and stability without surface working after sintering.

Another object of the present invention is to provide a method for producing an integral silicon nitride reaction-sintered body having an improved strength and a complicated shape from separately formed parts.

A further object of the present invention is provide a method for producing an integral silicon nitride sintered ceramic body composed of a plurality of members including an outer member, an inner member and bonding members, free from cracks or ruptures between the outer and inner members.

In order to accomplish the above-described objects, the inventors have conducted intensive investigation and research. As a result, it has been found that a sintered body having a low sintering shrinkage, high dimensional accuracy and stability and high strength can be produced by using, as a starting material, a mixture of at least two types of silicon powders having different particle size distribution ranges which do not overlap each other, and having a large average particle size; adding a sintering aid; and forming the resultant mixture into a green body having an increased density, which makes it possible to produce a sintered body with improved properties.

Further, the inventors have found that a reaction-sintered silicon nitride ceramic body having an improved strength can be produced by interposing a bonding material containing silicon powder having a particular average particle size, a sintering aid and a binder between the opposite surfaces of two green bodies to bond them, and sintering the bonded bodies in a nitrogen-containing atmosphere.

Furthermore, the inventors have noticed that in an injection molding for preparing a green body, the poor quality of the green body is caused by (1) weld marks due to high viscosity of a material to be injected, (2) weld marks due to abrupt solidification of the binder after molding, and (3) a large change in a volume of the green body upon solidification after the molding. As a result, it has been found that the weld marks (1) generated due to a high viscosity of the binder can effectively be prevented by selecting a binder having a low viscosity, that the weld marks (2) can effectively be prevented by using a binder which is gradually solidified, that the large volume change (3) can effectively be prevented by using a binder which exhibits a low change in volume under injection molding conditions. Experiments on various waxes for binders have revealed that maleinized waxes are preferable.

In addition, it has been found that the nitrogenation of silicon powder is considerably accelerated by mixing the mixture of silicon powder and sintering aids such as $Y_2O_3$ and $Al_2O_3$ with a particular metal or an oxide thereof having different valence from that of silicon and a particular ion radius and forming silicates having melting points in a proper range.

Furthermore, it has also been found (a) that a dense sintered body having an improved dimensional accuracy and stability is produced by using silicon powder having a large average particle size of 5 μm to 300 μm, (b) that the nitrogenation of silicon powder is accelerated by adding powder of iron or an oxide thereof to silicon powder, and (c) that the nitrogenation of silicon powder is further accelerated by adding powder of titanium or an oxide thereof together with powder of iron or an oxide thereof to the silicon powder, even when silicon powder having a large particle size is used. In addition, in the nitrogenation of silicon, a large proportion of $\alpha$-$Si_3N_4$ is selectively produced so that a dense sintered body is obtained by a phase conversion of $\alpha$-$Si_3N_4$ to $\beta$-$Si_3N_4$ occurring under a subsequent high-temperature sintering condition.

In one aspect of the present invention, there is provided a method for producing a silicon nitride reaction-sintered body comprising the steps of (1) forming a silicon powder mixture of at least two types of silicon powders having substantially independent particle size distribution ranges into a green body, the silicon powder mixture having an average particle size ranging from 5 μm to 300 μm; (2) heating the green body in a nitrogen-containing atmosphere for nitrogenation; and (3) sintering the nitrogenated green body at a temperature of 1900° C. or higher.

In another aspect of the present invention, there is provided a method for producing a silicon nitride reaction-sintered body comprising the steps of (1) preparing a silicon powder mixture of at least two types of silicon powders having substantially independent particle size distribution ranges, the silicon powder mixture having an average particle size ranging from 5 μm to 300 μm; (2) mixing the silicon powder mixture with a sintering aid including $Y_2O_3$ and at least one component selected from the group consisting of MgO, $CeO_2$, BeO, AlN, $La_2O_3$, $ZrO_2$, Fe and $Fe_2O_3$; (3) forming a mixture of the silicon powder mixture and the sintering aid into a green body; (4) heating the green body at a temperature of lower than 1500° C. in a nitrogen-containing atmosphere for nitrogenation; and (5) sintering the nitrogenated green body at a temperature ranging from 1500° C. to 1800° C.

In a further aspect of the present invention, there is provided a method for producing a silicon nitride reaction-sintered body comprising the steps of (1) preparing a plurality of green body parts from a mixture of silicon powder and a sintering aid powder; (2) bonding the plurality of green body parts together by interposing a bonding material between opposing surfaces of the plurality of green body parts to form an integrally bonded green body, the bonding material including silicon powder having an average particle size of 10 μm or less, a sintering aid powder and a binder; (3) nitrogenating the integrally bonded green body in a nitrogen-containing atmosphere at a nitrogenation degree of 90% or more; and (4) sintering the nitrogenated green body at 1900° C. or higher.

In a still further aspect of the present invention, there is provided a method for producing a silicon nitride reaction-sintered body comprising the steps of (1) mixing a silicon powder mixture of at least two types of silicon powders having substantially independent particle size distribution ranges with a sintering aid powder and a wax binder, the silicon powder mixture having an average particle size ranging from 5 μm to 300 μm; (2) injection-molding the resultant mixture into a green body; (3) degreasing the green body; (4) nitrogenating the degreased green body in a nitrogen-containing atmosphere; and (5) sintering the nitrogenated green body at 1900° C. or higher.

In a still further aspect of the present invention, there is provided an apparatus for producing a cylindrical green body comprising a first mold member made of a metal for defining an inner wall and one end of a cavity for forming the cylindrical green body; a second mold member made of an elastic material and engageable with the first mold member for defining an outer wall of the cavity for the cylindrical green body; and a third mold member made of an elastic material for defining the other end of the cavity for the cylindrical green body.

In a still further aspect of the present invention, there is provided a silicon nitride reaction-sintered body made of a powder mixture of (a) 82.0 to 98.4 weight % (in terms of $Si_3N_4$) of silicon powder, (b) 1.5 to 10.0 weight % of $Y_2O_3$ powder, (c) 5.0 weight % or less of $Al_2O_3$ powder, and (d) 0.1 to 3 weight % (on a metal basis) of a metal or an oxide thereof, the metal having a different valence from that of silicon and an ion radius of 0.3 Å to 1.0 Å, and a silicide of the metal having a melting point of 579° C. to 1450° C., the silicon nitride reaction-sintered body being produced by a process comprising the steps of forming the powder mixture into a green body, heating the green body in a nitrogen-containing atmosphere for nitrogenation and sintering the nitrogenated green body.

In a still further aspect of the present invention, there is provided a method for producing a silicon nitride reaction-sintered body comprising the steps of (1) forming a powder mixture into a green body, the powder mixture including (a) 82.0 to 98.4 weight % (in terms of $Si_3N_4$) of silicon powder, (b) 1.5 to 10.0 weight % of $Y_2O_3$ powder, (c) 5.0 weight % or less of $Al_2O_3$ powder, and (d) 0.1 to 3 weight % (on a metal basis) of a metal or an oxide thereof, the metal having a different valence from that of silicon and an ion radius of 0.3 Å to 1.0 Å, and a silicide of the metal having a melting point of 579° C. to 1450° C.; (2) nitrogenating the green body at a temperature of 1250° C. to 1450° C. in a nitrogen-containing atmosphere; and (3) sintering the nitrogenated green body at 1900° C. or higher.

In a still further aspect of the present invention, there is provided a silicon nitride reaction-sintered body made of a powder mixture of (a) silicon powder having an average particle size of 5 μm to 300 μm, (b) powder of iron or an oxide thereof, and (c) powder of titanium or an oxide thereof, the silicon nitride reaction-sintered body being produced by a process comprising the steps of forming the powder mixture into a green body, heating the green body in a nitrogen-containing atmosphere for nitrogenation and sintering the nitrogenated green body.

In a still further aspect of the present invention, there is provided a method for producing a silicon nitride reaction-sintered body comprising the steps of (1) forming a powder mixture into a green body, the powder mixture including (a) silicon powder having an average particle size of 5 μm to 300 μm, (b) powder of iron or an oxide thereof, and (c) powder of titanium or an oxide thereof; (2) nitrogenating the green body in a nitrogen-containing atmosphere at a temperature of lower than 1500° C.; and (3) sintering the nitrogenated green body at a temperature of 1500° C. or higher.

In a still further aspect of the present invention, there is provided a method for producing a silicon nitride reaction-sintered body comprising the steps of (1) mixing silicon powder having an average particle size of 5 μm to 300 μm with an oxide powder of a metal of the group IIIa in the Periodic Table and silicon nitride powder; (2) forming the resultant powder mixture into a green body; (3) heating the green body in a nitrogen-containing atmosphere for nitrogenation; and (4) sintering the nitrogenated green body in a nitrogen-containing atmosphere.

In a still further aspect of the present invention, there is provided a method for producing a silicon nitride reaction-sintered body comprising the steps of (1) mixing silicon powder having an average particle size of 5 μm to 300 μm with a sintering aid including $Y_2O_3$, $Al_2O_3$ and silicon nitride powder; (2) forming the resultant powder mixture into a green body; (3) heating the green body in a nitrogen-containing atmosphere for nitrogenation; and (4) sintering the nitrogenated green body buried in a powdery surface roughing inhibitor including silicon nitride powder in a nitrogen-containing atmosphere.

In a still further aspect of the present invention, there is provided a method for producing a silicon nitride reaction-sintered body comprising the steps of (1) mixing silicon powder having an average particle size of 5 μm to 300 μm with a sintering aid; (2) forming the resultant powder mixture into a green body; (3) nitrogenating the green body in an atmosphere of nitrogen and 20% or less of hydrogen for nitrogenation; and (4) sintering the nitrogenated green body.

In a still further aspect of the present invention, there is provided a method for producing a composite green body of silicon nitride ceramics comprising the steps of (1) forming an outer member, an inner member and a plurality of bonding members from a powder mixture for silicon nitride ceramics; and (2) bonding the outer member and the inner member via the bonding members, wherein a sintering shrinkage of the outer member is greater than that of the inner member.

DETAILED DESCRIPTION OF PREFERRED EMBODIMENTS (1) Starting Materials (1) Silicon Powder An average particle size of a silicon powder mixture used in the present invention ranges from 5 µm to 300 µm. By using the silicon powder mixture having such an average particle size, it is facilitated to produce a green body having a high density. The green body having a large relative density exhibits a low shrinkage when subjected to sintering, resulting in the production of a ceramic body with an improved dimensional accuracy and stability. When silicon powder having an average particle size of less than 5 µm is used to form the ceramic body, the density of the ceramic body is lowered, and therefore a shrinkage of the ceramic body by sintering becomes large, resulting in poor dimensional accuracy and stability, further lowering the strength and toughness of the sintered body obtained. On the other hand, when an average particle size of the silicon powder exceeds 300 µm, there occurs melting of silicon powder in the ceramic body upon heating and the nitrogenation undesirably takes a long time. The silicon powder preferably has an average particle size ranging from 5 µm to 50 µm.

Incidentally, the term "average particle size" used herein means a volume-average particle size which can be measured by a LEEDS & NORTHRUP apparatus (the United States) or a MICROTRAC apparatus (France).

It is preferred that a maximum particle size of the silicon powder mixture be between 50 μm and 600 μm. When the maximum particle size of the silicon powder mixture is less than 50 μm, a density of the ceramic body is likely to be lowered, which leads to the production of the ceramic body having a large sintering shrinkage. On the other hand, when the maximum particle size of the silicon powder mixture exceeds 600 μm, there occurs elution of the silicon powder from the ceramic body upon heating and the nitrogenation is undesirably hindered. Preferably, the maximum particle size of the silicon powder mixture is between 50 μm and 100 μm.

Figure 1:
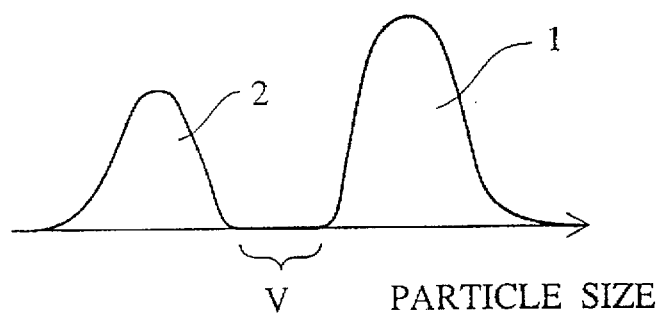
FIG. 1(a) is a schematic graph showing one example of a particle size distribution of silicon powder used in the method of the present invention.
FIG. 1(b) is a schematic graph showing another example of a particle size distribution of silicon powder used in the method of the present invention.
Figure 1:
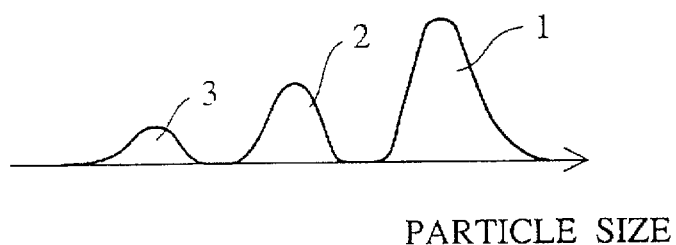

In the preferred embodiment, there is used a mixture of two or more types of silicon powders having particle size distribution ranges substantially different and independent from each other, as shown in FIGS. 1(a) and 1(b). The term "substantially different and independent particle size distribution ranges" means that the silicon powders used have particle size distribution ranges which do not substantially overlap each other.

In FIG. 1(a), the particle size distribution range of the silicon powder mixture consists of a large particle size distribution range 1 and a small particle size distribution range 2, in which the curves of distribution ranges do not substantially overlap each other. If the distribution ranges overlap, namely, if some silicon powder exists in an intermediate range V in FIG. 1(a), a density of the green body obtained is lowered. Preferably, the silicon powder in the distribution range 1 has a particle size between 10 μm and 80 μm and an average particle size ranging from 20 μm to 50 μm, while the silicon powder in the distribution range 2 has a particle size between 1 μm and 20 μm and an average particle size ranging from 2 μm to 5 μm. In case where the mixture of two silicon powders having such different size distribution ranges are used, a weight ratio of the silicon powder in the range 1 to the silicon powder in the range 2 is preferably 5:5 to 9:1, more preferably 7:3 to 8:2.

In FIG. 1(b), there is shown a particle size distribution range of the silicon powder mixture used in the present invention, in which three independent distribution ranges 1, 2 and 3 are indicated. In the preferred embodiment, the silicon powder contained in the distribution range 1 has a particle size between 20 μm and 80 μm and an average particle size of 30 μm to 50 μm. The silicon powder in the distribution range 2 has a particle size between 5 μm and 20 μm and an average particle size of 10 μm to 15 μm, and the silicon powder in the distribution range 3 has a particle size between 0.5 μm and 5 μm and an average particle size of 1 μm to 2 μm. If such three types of the silicon powders are mixed, the contents of the silicon powders in the powder mixture are preferably between 60 weight % and 80 weight % for the range 1, between 10 weight % and 30 weight % for the range 2, and between 5 weight % and 20 weight % for the range 3. The more preferable contents are between 65 weight % and 75 weight % for the range 1, between 15 weight % and 25 weight % for the range 2, and between 5 weight % and 15 weight % for the range 3.

In either case, the silicon powder mixture has an average particle size of 5 μm to 300 μm, preferably 5 μm to 50 82 m and the maximum particle size of 50 μm to 600 μm, preferably 50 μm to 100 μm, as described above.

(2) Sintering Aids

The sinterability of a green body is desirably improved by adding a sintering aid to silicon powder as a starting material, resulting in the production of the sintering ceramic body having enhanced strength and toughness. Examples of the sintering aids include $Al_2O_3$, $Y_2O_3$, $Yb_2O_3$, $HfO_2$ and compounds of other metals of Group IIIa in the Periodic Table. These sintering aids have an average particle size ranging from 0.1 μm to 5 μm, preferably from 0.1 μm to 3 μm. The preferred content of the sintering aid is 1–10 parts by weight based on 100 parts by weight of the silicon powder, though it is somewhat varied depending upon the kind of the sintering aid used. If the content of the sintering aid is less than 1 part by weight, the sintered body obtained has a low density, and therefore a low strength and toughness. On the other hand, if the content of the sintering aid exceeds 10 parts by weight, the sintered body undesirably has a low high-temperature strength.

When $Al_2O_3$ powder and $Y_2O_3$ powder are selectively used as the sintering aids, the preferred contents of these components are less than 5 weight %, more preferably less than 2 weight % for $Al_2O_3$ powder, and 1–10 weight %, more preferably 2.5–7.5 weight % for $Y_2O_3$ powder, with the silicon powder at 90–98 weight % ( in terms of $Si_3N_4$), based on the total weight of the green body.

In another preferred embodiment, there is used the sintering aid containing $Y_2O_3$ and at least one component selected from the group consisting of MgO, $CeO_2$, BeO, AlN, $La_2O_3$, $ZrO_2$, Fe and $Fe_2O_3$. The use of the sintering aid enables the production of the sintered body having an increased high-temperature strength, even when a sintering process is performed at a low temperature. In addition, the sintering aid is useful to prevent the problems occurring in a high-temperature sintering process, which include the decomposition of silicon nitride near a surface of the sintered body and the evaporation of silicon or oxides thereof produced by the decomposition. As a result, surface roughening can be prevented, thereby improving an as-sintered strength of the sintered body. An average particle size of the sintering aid used in the present invention is preferably 0.1 μm to 5 μm. Preferred combinations of the sintering aids are $Y_2O_3$+MgO, $Y_2O_3$+$Al_2O_3$+MgO, and $Y_2O_3$+AlN. The content of $Y_2O_3$ is preferably between 1 weight % and 10 weight %, more preferably between 3 weight % and 10 weight %, and the content of at least one component selected from the group consisting of MgO, $CeO_2$, BeO, AlN, $La_2O_3$, $ZrO_2$, Fe and $Fe_2O_3$ is preferably between 1 weight % and 10 weight %, more preferably between 3 weight % and 10 weight %, based on the total weight of the silicon powder (in terms of $Si_3N_4$) the sintering aids and $Si_3N_4$ powder (if any).

(3) Nitrogenation Accelerator

In a preferred embodiment, the nitrogenation of silicon is accelerated by using a powder of a metal or an oxide thereof, which metal has a different valence and an ion radius of 0.3 Å to 1.0 Å and forms a silicide having a melting point of 579° C. to 1450° C.

It is presumed that the nitrogenation proceeds as follows: First, silicon powder is melted at least on a surface thereof, and the molten silicon powder is reacted with nitrogen in an atmosphere to produce silicon nitride ($Si_3N_4$). The nitrogenation of silicon powder gradually proceeds from a surface to an internal portion of each silicon powder particle. A nitrogenation time of the silicon powder is determined by the diffusion velocity of nitrogen into $Si_3N_4$ formed on the surface of each particle at an initial stage of the nitrogenation. Accordingly, the nitrogenation of silicon powder can be accelerated by increasing a diffusion rate of nitrogen into $Si_3N_4$. Since the diffusion of nitrogen into $Si_3N_4$ is a so-called hole diffusion, it is desirable to add an element contributing to the formation of holes in $Si_3N_4$, to accelerate the nitrogenation of silicon to $Si_3N_4$. The element to be added is a metal which has a different valence from that of silicon powder and has a capability of replacing for silicon atoms in the $Si_3N_4$, namely a capability of forming a substitution-type solid solution in which silicon is substituted with the metal. Specifically, usable as the nitrogenation accelerator is a metal having a chemical valence other than +4, preferably a valence of +3, and an ion radius of 0.3 Å to 1.0 Å. If the ion radius exceeds 1.0 Å, the metal cannot create a substitution-type solid solution having holes but forms a penetration-type solid solution in which holes are not generated in $Si_3N_4$. On the other hand, when the ion radius is less than 0.3 Å, the metal cannot generate holes in $Si_3N_4$. Therefore, the preferred ion radius of the metal to be added as a nitrogenation accelerator ranges from 0.64 Å to 0.67 Å.

As described above, $Si_3N_4$ is produced by reacting the molten silicon powder with nitrogen. Accordingly, it is suitable that a silicide of the nitrogenation accelerator metal has a melting point between 579° C. to 1450° C. If the melting point is less than 579° C., the metal is evaporated as a silicide from a liquid phase containing molten silicon and the metal under the nitrogenation condition. Therefore, no nitrogenation-accelerating effects are created by the addition of the metal. On the other hand, if the melting point of the metal exceeds 1450° C., there occurs no formation of a liquid phase containing both the molten silicon and metal, which does not result in accelerated nitrogenation.

A suitable metal meeting the above requirements is at least one of Fe, Cr and Co. Furthermore, when titanium is used in combination with Fe, Cr or Co, the nitrogenation is further accelerated, because the formation of the substitution-type solid solution with Fe, Cr or Co is facilitated by the addition of Ti which removes oxygen near a surface of the silicon powder. By the addition of titanium, the nitrogenation temperature can be lowered to about 1100° C. from 1400° C. which is necessary in the nitrogenation without titanium, resulting in the selective production of $\alpha$-$Si_3N_4$. Particularly, a combination of Fe and Ti is most suitably used. It is suitable that these metals as nitrogenation accelerators have an average particle size of 0.5 μm to 5 μm either in the form of metal or an oxide thereof.

The content of the nitrogenation accelerator is 0.1–3 weight % (on a metal basis) based on the total weight of the ceramic material. If the content of the nitrogenation accelerator is less than 0.1 weight %, a sufficient nitrogenation-accelerating effect is not obtained. On the other hand, if the content of the nitrogenation accelerator exceeds 3.0 weight %, the sintered body exhibits a low high-temperature strength. Preferably, the content of the nitrogenation accelerator is 0.3–1.0 weight %.

If a combination of Fe+Ti is used, the content of Fe or $Fe_2O_3$ is 0.05–1.5 weight %, preferably 0.15–0.5 weight % (on a metal basis), and the content of Ti or $TiO_2$ is 0.05–1.5 weight %, preferably 0.15–0.5 weight % (on a metal basis).

(4) $\alpha$-$Si_3N_4$ Powder

The moldability of the powder mixture is improved by the addition of $\alpha$-$Si_3N_4$ powder which has an average particle size between 0.1 μm and 1 μm, preferably between 0.2 μm and 0.5 μm. The content of the $\alpha$-$Si_3N_4$ powder is preferably 10–30 parts by weight, more preferably 15–20 parts by weight based on 100 parts by weight of the silicon powder.

(2) Green Body (1) General Forming Method

A green body is prepared by mixing the components of the starting material at a mixing ratio as described above. The mixing of the starting ceramic powders is made by any known methods such as a ball-milling method, a dispersion method, etc. If the mixing is carried out by a ball mill, it is suitable to add a dispersion medium such as water, ethanol, butanol and so on to the starting ceramic material. The molding of the green body is conducted by any known methods such as a die pressing method, a cold isostatic pressing method, a slip-casting method, an injection molding method, etc.

(2) Production of Green Body with Complicated Shape (a) Production of Parts

Figure 3:
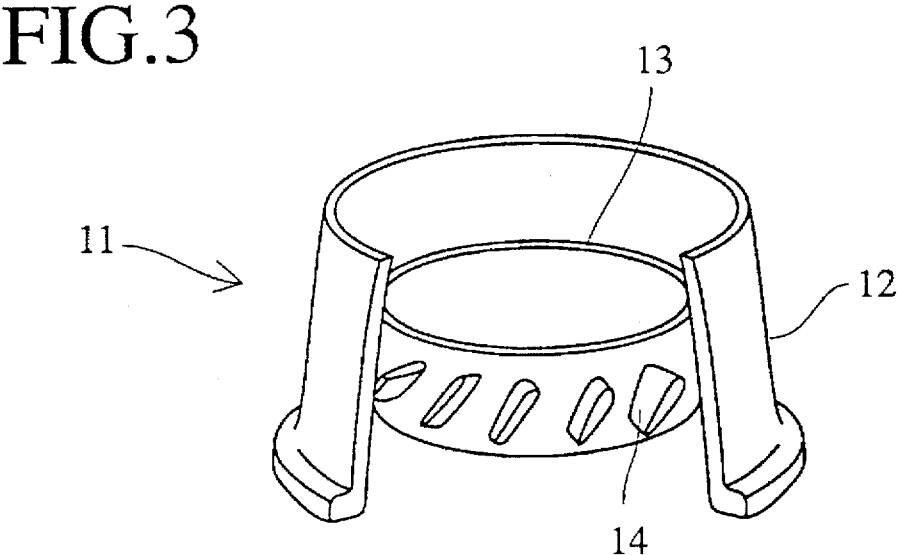
FIG. 3 is a partially broken, perspective view showing a ceramic body with a complicate shape, which is manufactured by the method of the present invention.
Figure 4:
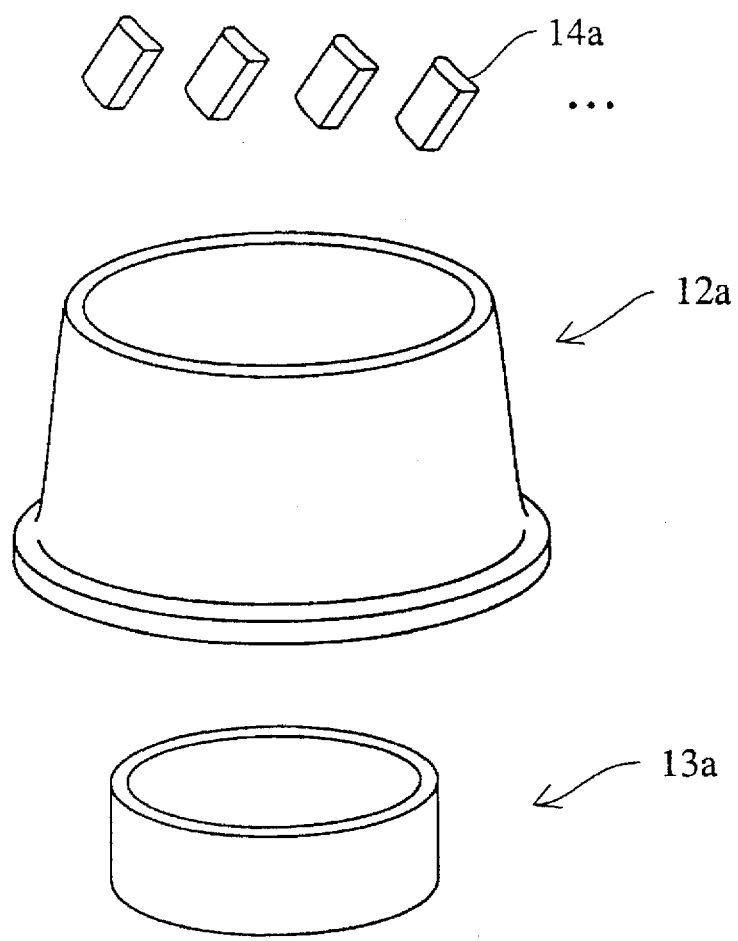
FIG. 4 is a perspective view showing parts used for manufacturing the ceramic body shown in FIG. 3.

The production of a green body having a complicated shape will be explained, taking a ceramic body 11 shown in FIG. 3 for instance. The ceramic body 11 includes a first cylindrical member 12 having a downward increasing diameter, a second cylindrical member 13 disposed concentrically within the first cylindrical member 12 and a plurality of plate-like members 14 disposed between the first and second members 12, 13. Each of the plate-like members 14 is bonded at opposite ends thereof to an inner surface of the first member 12 and an outer surface of the second member 13, so that the first and second members 12, 13 are bonded together via the plate-like members 14. To prepare an integral green body, three parts 12a, 13a and 14a shown in FIG. 4 corresponding to the first member 12, the second member 13 and the plate-like members 14, respectively are prepared separately, and these separate parts are bonded together as shown in FIG. 4.

(b) Bonding of Parts

In the production of the integral green body, the separate parts described above may be combined without any bonding material therebetween. However, it is desired that a bonding material is applied to the bonding portions of the separate parts. Silicon powder may effectively be used as a bonding material with a thin layer applied to the bonding surfaces. An average particle size of the silicon powder is preferably less than 10 μm, more preferably between 0.1 μm and 2 μm. In addition, it is suitable that the silicon powder is uniformly dispersed in a dispersion medium such as ethanol when applied to the surfaces to be bonded.

Another example of the bonding material is a mixture of silicon powder, a sintering aid powder and a binder. In this case, the silicon powder has an average particle size of less than 10 μm. When the average particle size of the silicon powder exceeds 10 μm, a sintered body obtained has a low mechanical strength in the bonded portions. The preferred average particle size of the silicon powder is less than 5 μm. A maximum particle size of the silicon powder used is suitably between 10 and 15 μm. The sintering aid powder preferably is the same as in the starting material of the green body. An average particle size of the sintering aid is suitably between 0.1 μm and 5 μm. A suitable binder is an organic binder including ethyl alcohol, ethyl silicate, polyethylene glycol, polyvinyl alcohol (PVA), etc. with or without water.

The proportions of the components in the bonding material are suitably 90–99 weight % (in terms of $Si_3N_4$) for the silicon powder and 1–10 weight % for the sintering aid powder, based on the sum thereof. When a powder mixture of $Al_2O_3$ and $Y_2O_3$ is used as the sintering aid, the content of the silicon powder is 90–98 weight % (in terms of $Si_3N_4$), the content of $Al_2O_3$ powder is 3 weight % or less, and the content of $Y_2O_3$ powder is 2–10 weight %. Further, the content of the binder is suitably 30–70 parts by weight per 100 parts by weight of the total of the silicon powder and the sintering aid used in the bonding material.

The bonding material may be prepared in the following manner. Predetermined amounts of the silicon powder, the sintering aid and the binder are sufficiently mixed by a mortar, a ball mill, etc. When the binder is mixed with ethyl alcohol, PVA, water, etc., it is suitable that these components are preliminarily mixed enough.

Before the bonding material is applied to the surfaces to be bonded, it is suitable that the surfaces of the separate parts are impregnated with a solvent such as alcohol compatible with the binder. The bonding material is then applied to the surfaces to be bonded, and the separate parts are brought into contact with each other to prepare an integral green body.

When a binder containing fine silicon powder is applied to the surfaces to be bonded, silicon powder particles appearing on the surface are in contact with silicon powder particles in the bonding material at many points, resulting in an increase in the amount of silicon nitride particles existing in the bonded portions after sintering, and thus improving the bonding strength of the sintered body. In addition, if the nitrogenation of the bonded green body is conducted at such a temperature that no evaporation and elution of silicon powder in the body occur, to a nitrogenation degree of 90% or more, defects such as excessively grown crystal grains and voids, etc. in the bonded portions can be suitably prevented.

(3) Injection Molding

When the green body is prepared by an injection molding process, it is suitable to employ a starting material containing 50 to 80 volume % of ceramic powder and 50 to 20 volume % of a binder. The suitable binder includes a wax binder containing 5 to 50 volume % of maleinized wax based on the total volume of the binder. The maleinized wax is a mixture of a low-molecular weight copolymer obtained by reacting a polyolefin with maleic acid anhydride, with an identical amount of a paraffin wax. The other components including paraffin, stearic acid and a dispersing agent may be contained in the binder. In this case, the contents are 50 to 80 volume % for paraffin, 5 to 30 volume % for stearic acid and 2 to 20 volume % for the dispersing agent.

In the injection molding method, when the content of the binder in the starting material exceeds 50 volume %, a degreasability (easiness of degreasing) of the green body is deteriorated, resulting in a lowered density of the sintered body. On the other hand, when the content of the binder is less than 20 volume %, the moldability of the starting material to be injected becomes low due to its high viscosity. The preferred content of the binder is between 20 and 40 volume %.

Figure 9:
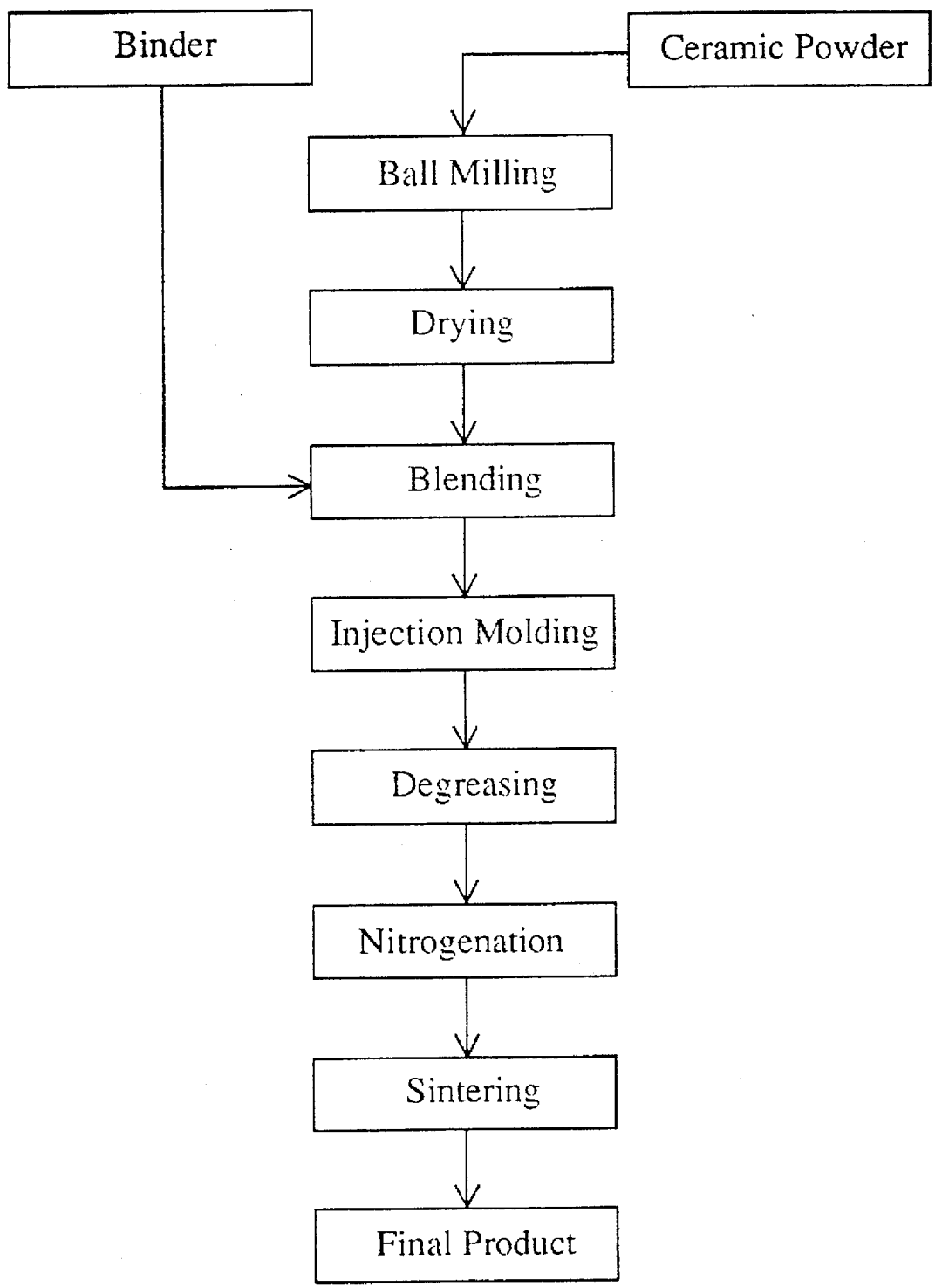
FIG. 9 is a view showing a flow chart showing the manufacturing process of a sintered body including an injection molding step according to the present invention.

The injection molding method may be generally performed in a manner shown in FIG. 9. First, a mixture of silicon powder and a sintering aid is mixed by a ball mill. After drying, a binder is added to the powder mixture, and the resultant mixture is heated to a temperature at which the binder exhibits a sufficient flowability and injection-molded to obtain a green body. After removal of the binder from the green body, the green body is sintered to prepare a final ceramic article.

Figure 14:
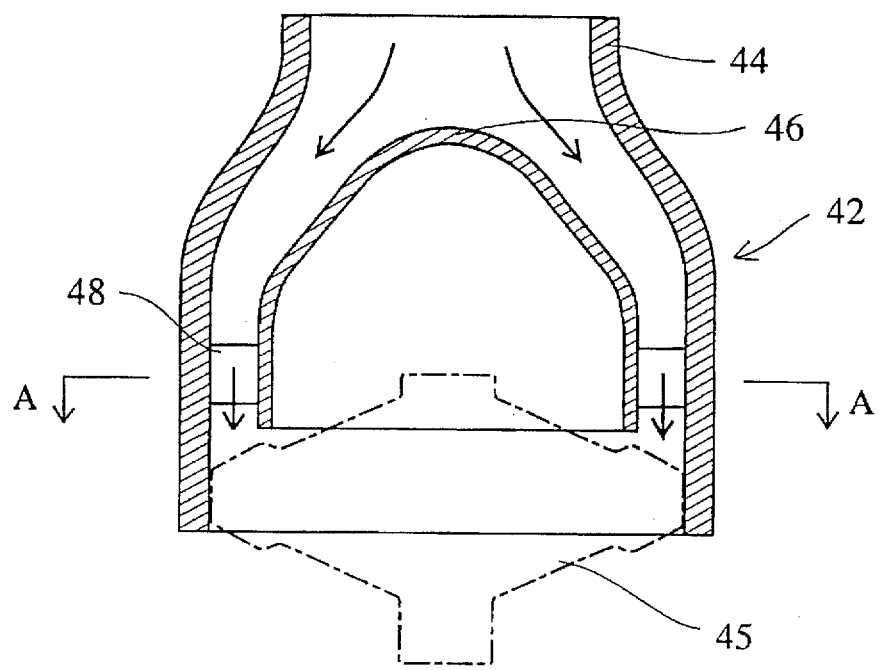
FIG. 14(a) is a sectional view showing a nozzle body member including an outer nozzle member, an inner nozzle member and nozzle vanes.
FIG. 14(b) is a sectional view taken along the line A—A of FIG. 14(a)
Figure 14:
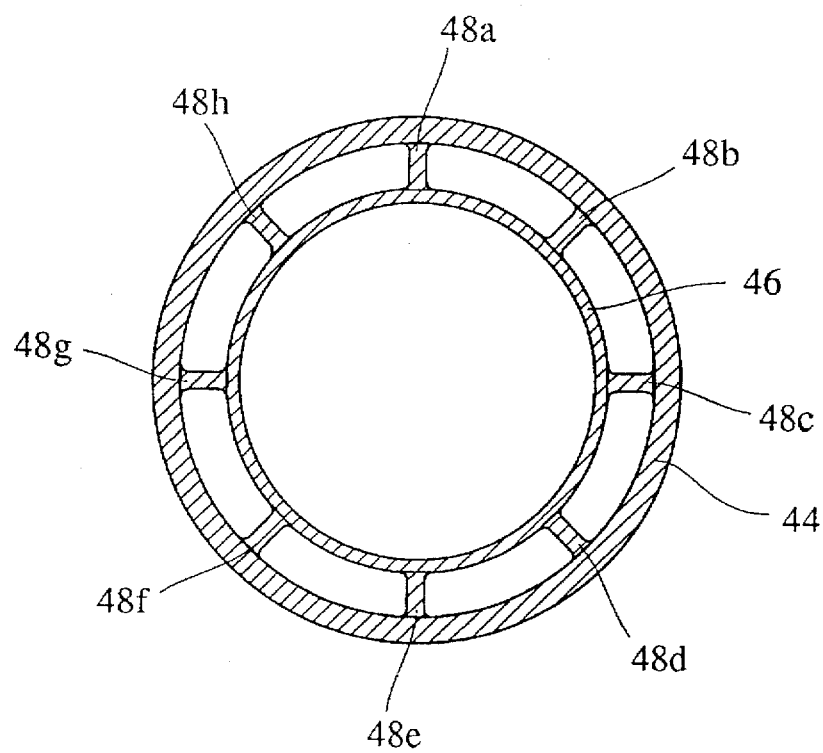

The injection molding method is particularly suitable for the production of an integral green body having a complicated shape, which would have to be produced by bonding the separately formed parts together in the other methods. For instance, in the case of the nozzle body 42 as shown in FIGS. 14(a) and 14(b), the inner nozzle member 46 and the nozzle vanes 48a–48h may be integrally injection-molded, and the outer nozzle member 44 may be combined therewith to provide an integral green body for the nozzle body 42 at considerably reduced total production costs.

(4) CIP Apparatus

Figure 5:
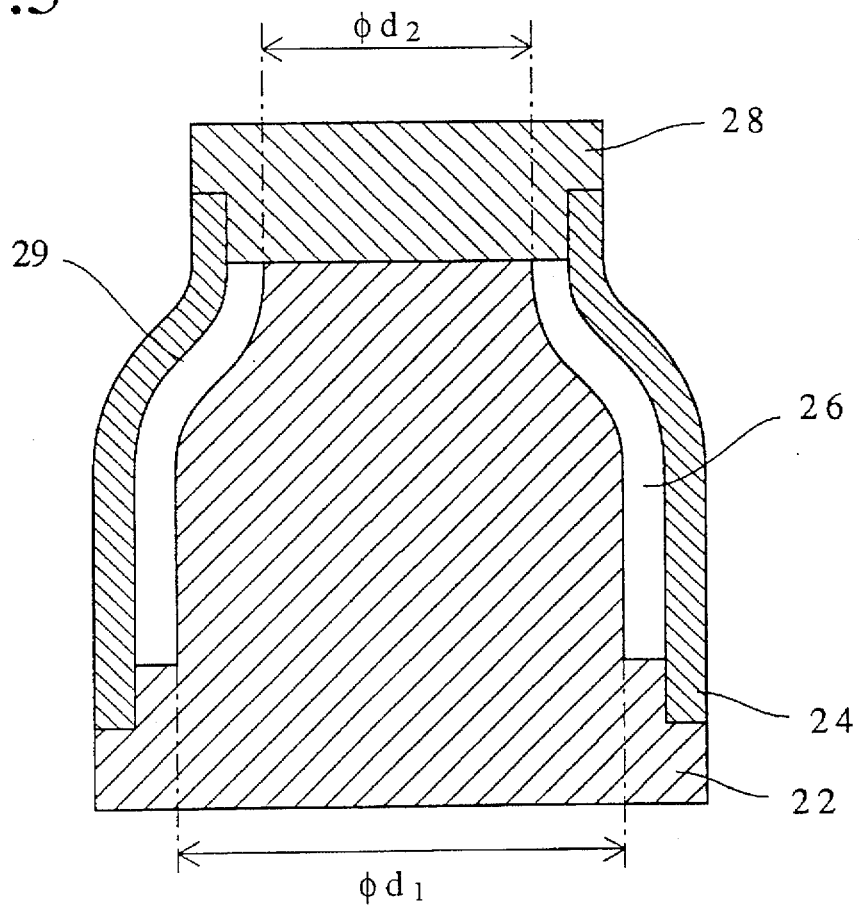
FIG. 5 is a schematic cross sectional view showing a cold isostatic pressing (CIP) apparatus.
Figure 6:
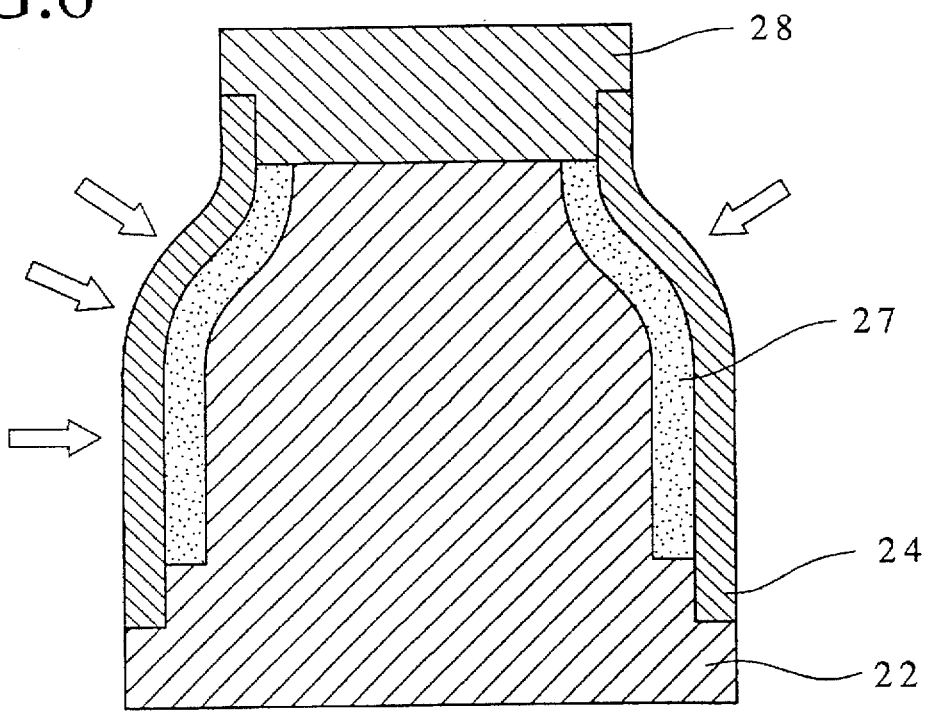
FIG. 6 is a schematic cross sectional view showing a cold isostatic pressing (CIP) apparatus which is charged with a ceramic powder.

As shown in FIG. 5, a cold isostatic pressing (CIP) apparatus used for the production of a cylindrical ceramic body may have a similar structure to that of a conventional one. A feature of the CIP apparatus of the present invention resides in a materiel for a mold member. Specifically, the CIP apparatus includes a first mold member 22 for defining an inner surface and an lower end of a cavity 26 for the ceramic body, a second mold member 24 for defining a outer surface of the cavity 26, and a third mold member 28 for defining an upper end of the cavity 26. The first mold member 22 is made of a metal, while the second and third mold members 24 and 28 are made of an elastic material, preferably a rubber material such as a natural rubber. The cavity 26 of the CIP apparatus has a larger diameter $\phi d1$ at a lower end and a smaller diameter $\phi d2$ of at an upper end, the diameter $\phi d1$ decreasing to $\phi d2$ in a tapered portion 29.

Figure 7:
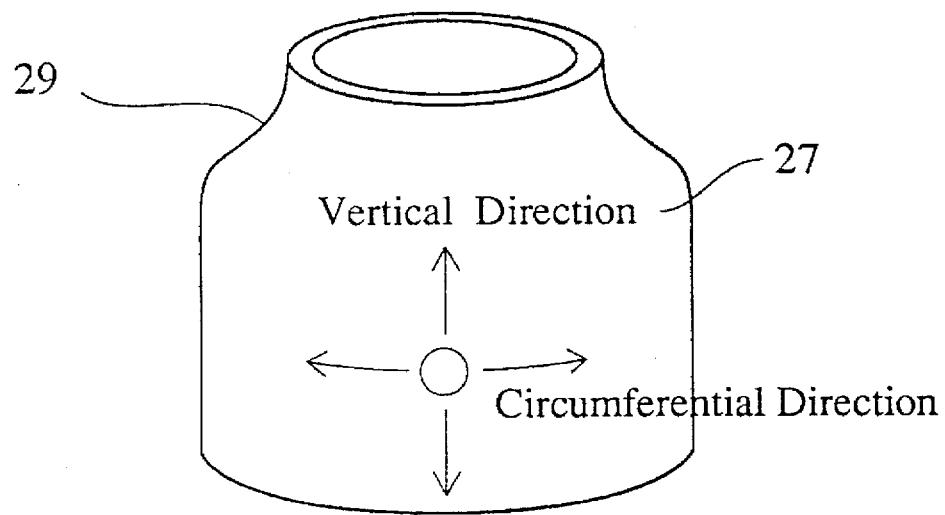
FIG. 7 is a schematic view showing a ceramic powder charged into a cylindrical cavity of the cold isostatic pressing (CIP) apparatus as shown in FIG. 6.
Figure 8:
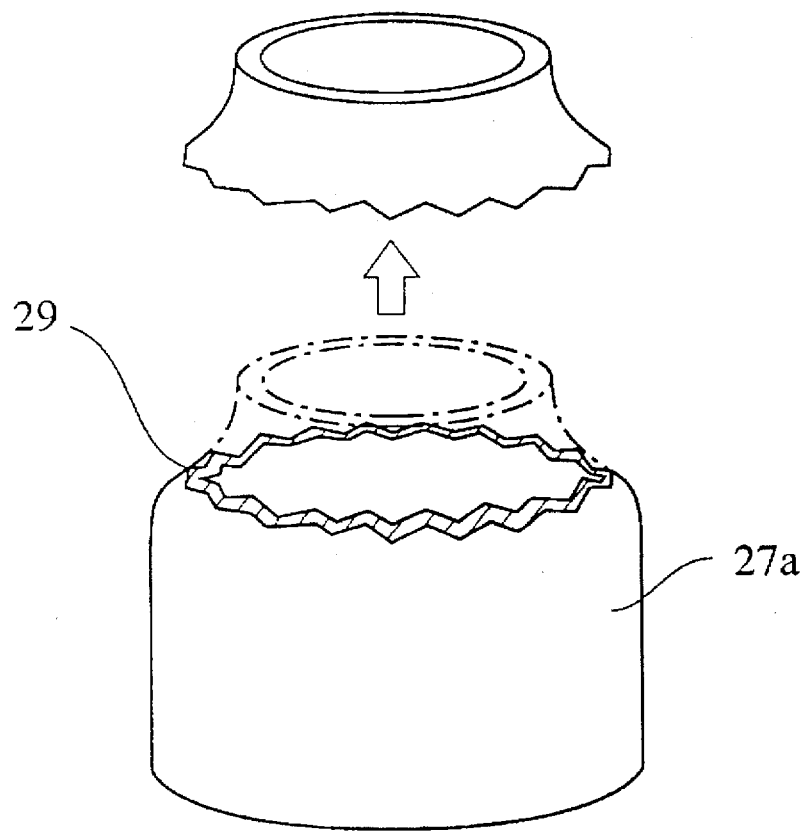
FIG. 8 is a perspective view showing a ceramic body manufactured according to the prior art method, which is broken at a tapered portion.

In the apparatus thus constituted, ceramic powder 27 is charged into the cavity 26 defined by the first, second and third mold member 22, 24 and 28. After the closure of the cavity 26 with the third mold member 28, an hydraulic fluid pressure is applied to an outer surface of the second mold member 24 from outside so that the second mold member 24 is uniformly deformed inward, thereby compressing the ceramic powder 27. Upon application of the hydraulic fluid pressure, the ceramic powder 27 is permitted to flow not only in the circumferential direction but also in the axial or vertical direction due to an elasticity of the third mold member 28 as shown in FIG. 7. The green body thus produced does not exhibit anisotropy.

Upon removal of the hydraulic pressure, the axially rebounding force of the ceramic powder 27 is absorbed by the deformation of the third mold member 28 due to its resiliency, resulting in reduction of a stress generated at the tapered portion of the ceramic body 27a due to a so-called spring back phenomenon, thereby preventing occurrence of cracks.

(5) Adjustment of Sintering Shrinkage

Figure 15:
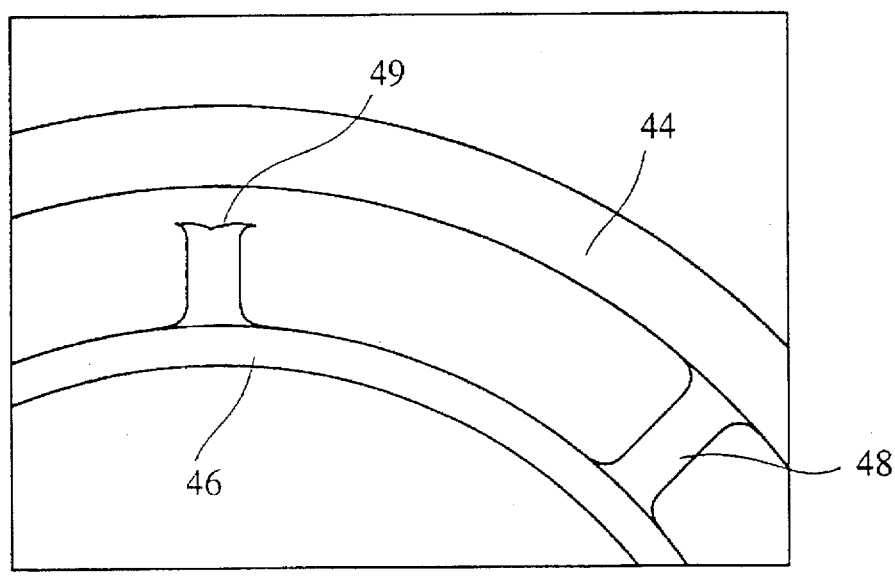
FIG. 15 is a schematic view showing the nozzle body member shown in FIGS. 14(a) and 14(b), in which cracks are generated at the junction of the nozzle vane to the outer nozzle member.

The nozzle body 42 shown in FIGS. 14(a) and 14(b) occasionally suffers from cracks or ruptures in the bonded portions of the nozzle vanes 48a–48h to the outer nozzle member 44 as shown in FIG. 15. Incidentally, reference numeral 45 denotes a turbine rotor in FIG. 14(a). The inventors' investigations have revealed that even though all the members 44, 46, 48 are prepared by the same material, sintering shrinkage may not be uniform among them depending upon variations in molding conditions such as pressures, and that if the sintering shrinkage of the inner nozzle member 46 is greater than that of the outer nozzle member 44, cracks or ruptures are likely to occur at either or both ends of the nozzle vanes 48a–48h bonded to the outer and/or inner nozzle member 44, 46 by sintering, because strain is concentrated there. Accordingly, if the sintering shrinkage of the outer nozzle member 44 is greater than that of the inner nozzle member 46, the cracks or ruptures would be prevented.

In order that the outer nozzle member 44 has a greater sintering shrinkage than that of the inner nozzle member 46, it is necessary that the density of the outer nozzle member 44 is greater than that of the inner nozzle member 46. The difference in density between the outer and inner nozzle members 44, 46 can be accomplished (a) by using a greater molding pressure for the outer nozzle member 44 than for the inner nozzle member 46, or (2) by making the amount of a binder smaller for the outer nozzle member 44 than for the inner nozzle member 46.

Figure 13:
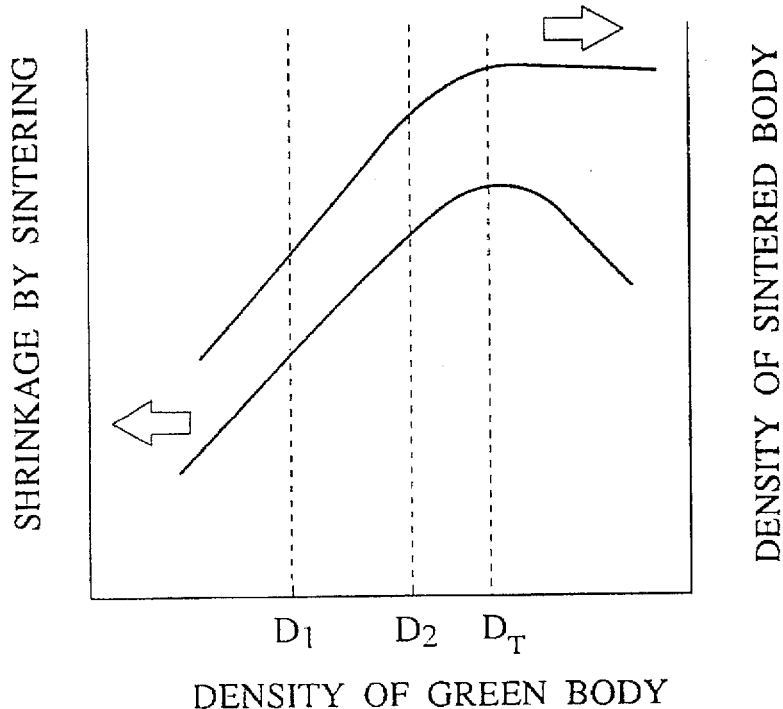
FIG. 13 is a graph showing the relation between a density of a green body and a sintering shrinkage and a density of a sintered body.

The nitrogenation process causes the silicon powder particles to somewhat expand, and the sintering process reduces a pore volume in the green body. Since the density of the sintered body increases in proportion to the density of the green body when the density of the green body is not greater than a threshold value "DT", the sintering shrinkage of the green body eventually increases in proportion to the density of the green body. Accordingly, the relation between the density of the green body and the sintering shrinkage shown in FIG. 13 is obtained. When the density of the green body exceeds the threshold value "DT", the sintering shrinkage of the green body is rather reduced because the expansion of the silicon powder becomes larger than the reduction of pore volume. For instance, if the molding pressure for the outer and inner nozzle members 44, 46 are adjusted such that the outer nozzle member 44 has a density D2 and the inner nozzle member 46 has a density D1, then the sintering shrinkage of the outer nozzle member 44 is always maintained greater than that of the inner nozzle member 46 even though molding pressure varies more or less within a tolerance. As a result, since the inner nozzle member 46 is kept slightly compressed by the outer nozzle member 44, any cracks or ruptures do not occur in the bonded portions.

It is preferred that the density of the outer nozzle member 44 be greater by 1–5% (based on a theoretical density) than that of the inner nozzle member 46. If the density difference between the outer nozzle member 44 and the inner nozzle member 46 exceeds 5%, too much compression force is exerted onto the inner nozzle member 46 so that either the outer or inner nozzle member 44, 46 suffers from undesirable deformation. On the other hand, when the density difference is less than 1%, the density of the inner nozzle member 46 may undesirably happen to be greater than that of the outer nozzle member 44 depending upon the molding conditions.

The difference in density between the outer nozzle member 44 and the inner nozzle member 46 can also be accomplished by another measure in which the amount of the binder used in the injection molding method is controlled. When the amount of the binder increases, a pore volume in the green body increases by degreasing, resulting in lowering the density of the green body. On the other hand, when the amount of the binder decreases, the density of the green body increases. Actually, it is preferred that the content of the binder be between 20 volume % and 30 volume % for the outer nozzle member 44 and between 30 volume % and 35 volume % for the inner nozzle member 46 based on the total amount of the injection molding ceramic material. When the amount of the binder is too greater, the density of the green body is considerably lowered. On the other hand, when the amount of the binder is too small, poor moldability occurs due to an increase in viscosity so that the staring ceramic material cannot be well injection-molded.

(3) Nitrogenation

The green body is heated in a nitrogen-containing atmosphere, preferably in a nitrogen gas atmosphere, to nitrogenate silicon in the green body. With respect to the nitrogenation conditions, a temperature, a nitrogen partial pressure and treating time are adjusted such that the green body has a nitrogenation degree of 90% or higher, preferably 95% or higher. The nitrogenation degree is expressed by a percentage of the silicon nitride produced by the nitrogenation to silicon originally existing in the green body. When the nitrogenation degree is less than 90%, a strength of the sintered body is lowered.

A nitrogenation temperature is 1250° C. or higher and less than 1500° C., preferably between 1250° C. and 1450° C., though it may vary somewhat depending upon the thickness of the green body to be nitrogenated. A pressure of the nitrogen-containing atmosphere is 1 kg/cm$^2$ or higher, preferably between 5 kg/cm$^2$ and 2000 kg/cm$^2$. The nitrogenation does not proceed well, if the temperature is lower than 1250° C. or the pressure is less than 1 kg/cm$^2$. On the other hand, when the heating temperature exceeds 1500° C., the elution or evaporation of the silicon powder in the green body undesirably occurs. The nitrogenation time is generally between 1 hour and 10 hours, though it may vary somewhat depending upon the thickness of the green body, the nitrogenation temperature, etc.

The nitrogenation may be conducted under the above conditions so that silicon nitride composed primarily of α-Si$_3$N$_4$ is produced. The production of the silicon nitride from silicon causes an expansion of silicon nitride particles in the green body so that a pore volume (vacancy between powder particles) in the green body is considerably reduced.

The nitrogenation may be performed in the atmosphere if a gaseous mixture of hydrogen and nitrogen to increase α-ratio (a ratio of α-Si$_3$N$_4$ to α-Si$_3$N$_4$+β-Si$_3$N$_4$). When the content of hydrogen exceeds 20 volume % based on the total volume of the atmosphere, the amount of a residual silicon powder in the green body increases. Therefore, it is suitable that the content of hydrogen is less than 20 volume %, preferably between 10 volume % and 20 volume %, based on the total volume of the atmosphere.

(4) Sintering (1) General Conditions

The nitrogenated ceramic body is sintered in a non-oxidizing atmosphere, preferably in a nitrogen-containing atmosphere at a temperature of 1500° C. or higher, preferably from 1700° C. to 2000° C. If the sintering temperature is lower than 1500° C., the sintered body exhibits low strength and toughness. On the other hand, when the sintering temperature exceeds 2000° C., a growth of crystal grains in the green body is excessively accelerated, resulting in low strength. Especially, when there is used as sintering aids a combination of Y$_2$O$_3$ and at least one component selected from the group consisting of MgO, CeO$_2$, BeO, AlN, La$_2$O$_3$, ZrO$_2$, Fe and Fe$_2$O$_3$, the sintering can be desirably conducted at a low temperature between 1500° C. and 1800° C. Such a low sintering temperature prevents the decomposition of the silicon nitride existing on a surface of the green body.

The pressure of the atmosphere is suitably between 5 kg/cm$^2$ and 2000 kg/cm$^2$. In this case, the sintering time of 1 hour to 5 hours may be sufficient for sintering. When the sintering is conducted under the above conditions, α-Si$_3$N$_4$ formed in the nitrogenation is converted to needle-like crystal grains of β-Si$_3$N$_4$. The production of dense, needle-like crystal grains of β-Si$_3$N$_4$ leads to considerable improvement in strength and toughness of the sintered body.

(2) Surface Roughening Inhibitor Powder

The sintering may be conducted using a powdery surface roughness inhibitor in which the ceramic body is buried during the sintering process. The use of the surface roughness inhibitor prevents the decomposition and evaporation of the silicon nitride on a surface of the green body. Accordingly, the sintered body exhibits an improved as-sintered strength (strength measured on the ceramic body which is not subjected to surface working after sintering).

A suitable powdery surface roughness inhibitor includes a mixture of silicon powder, silicon nitride powder and a sintering aid powder such as Y$_2$O$_3$, Al$_2$O$_3$, etc. The addition of silicon powder effectively prevents the decomposition of the silicon nitride in the ceramic body and traps a trace amount of oxygen in the nitrogen atmosphere by reaction therewith, whereby a factor adversely affecting the quality of the ceramic body is effectively removed. The addition of Y$_2$O$_3$ and Al$_2$O$_3$ to the silicon nitride serves to prevent the decomposition of silicon nitride and the evaporation of the sintering aid in the green body. In one preferred embodiment, a suitable surface roughness inhibitor is a mixture of silicon powder, silicon nitride powder, $Y_2O_3$ and if any, $Al_2O_3$. The contents are 1–30 weight % for the silicon powder, 40–89 weight % for the silicon nitride powder, and 10–30 weight % for $Y_2O_3$ with or without $Al_2O_3$, respectively. An average particle size of the surface roughness inhibitor powder is between 0.1 μm and 10 μm, though not limited thereto.

(3) Structures of Green Body and Reaction-Sintered Body

Figure 2:
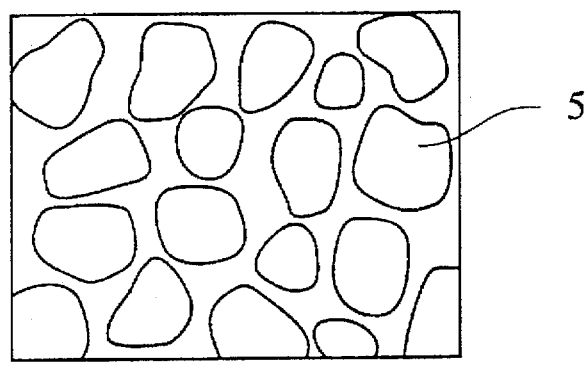
FIG. 2(a) is a schematic view showing silicon powder particles in a green body before nitrogenation.
FIG. 2(b) is a schematic view showing silicon powder particles in a nitrogenated green body.
FIG. 2(c) is a schematic view showing silicon powder particles in a sintered body.
Figure 2:
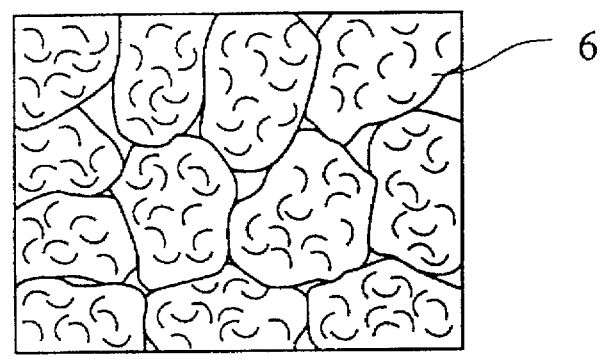
Figure 2:
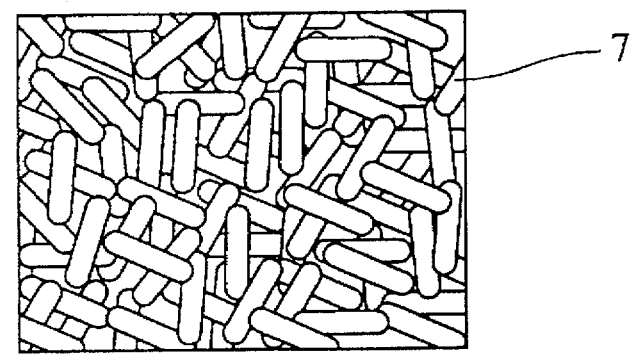

A change in structure from the green to the sintered body is explained with reference to FIGS. 2(a), 2(b) and 2(c). FIG. 2(a) shows silicon powder particles in the green body, FIG. 2(b) silicon nitride particles in the nitrogenated green body, and FIG. 2(c) silicon nitride particles in the sintered body. Even when a high molding pressure is employed, there still exist relative large vacancies between the silicon powder particles in the green body as shown in FIG. 2(a). If such a green body is nitrogenated, the silicon powder particles are converted to silicon nitride particles as shown in FIG. 2(b). During the change in a structure from FIG. 2(a) to FIG. 2(b), the particles are expanded so that the vacancies between silicon powder particles are reduced. Under the above conditions, the silicon nitride particles 6 as shown in FIG. 2(b) contain $\alpha$-$Si_3N_4$. When subjected to sintering, $\alpha$-$Si_3N_4$ powders 6 are converted to needle-like crystalline powders as shown in FIG. 2(c). As a result, a dense sintered structure is formed, enhancing the strength and toughness of the sintered body.

When the green body bonded with the bonding material is sintered, a well grown needle-like crystalline structure of $\beta$-$Si_3N_4$ is formed in the bonded portions. A network structure of $\beta$-$Si_3N_4$ serves to enhance a bonding strength. Accordingly, the sintered body thus obtained exhibits not only an improved strength in the bonded portions but also an enhanced strength and toughness in the overall sintered body.

The present invention will be described in further detail by way of the following Examples without intention of restricting the scope of the present invention.

EXAMPLE 1

96.5 weight % (in terms of $Si_3N_4$) of silicon powder having an average particle size of 60 μm and a maximum particle size of 200 μm was mixed with 2.5 weight % of $Y_2O_3$ powder having an average particle size of 1 μm and a maximum particle size of 5 μm and 1 weight % of $Al_2O_3$ powder having an average particle size of 0.8 μm and a maximum particle size of 5 μm as sintering aids. Added to 500 g of the mixture was 600 g of ethanol and the mixture was ball-milled for 10 hours. The ball-milled admixture was dried by a rotary evaporator and subjected to cold isostatic pressing (CIP) at 3000 kg/cm₂ to obtain a green body of 30 mm×50 mm×5 mm. Meanwhile, the average particle size of the powders was measured by MICROTRAC device.

The green body was then nitrogenated at 1400° C. for 4 hours in a nitrogen atmosphere. After the nitrogenation, the temperature was elevated to 1950° C. at which the nitrogenated green body was sintered for 4 hours in a nitrogen atmosphere at 9 kg/cm².

Figure 16:
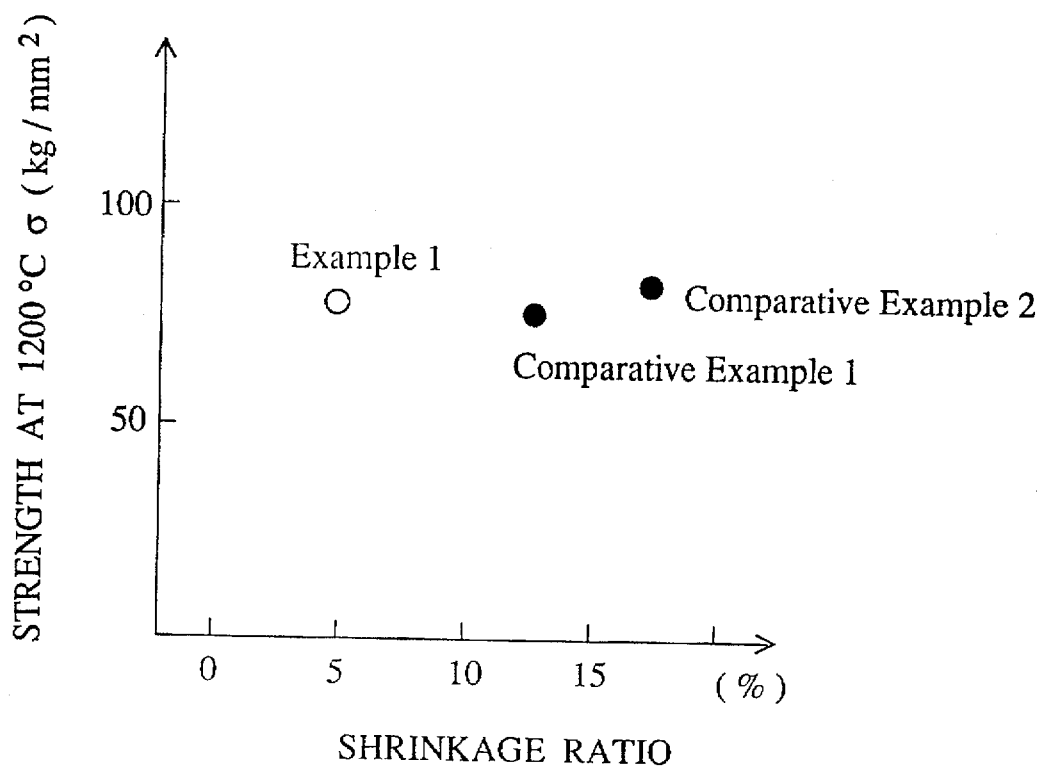
FIG. 16 is a graph showing the relation between a sintering shrinkage and a strength of the sintered body in Example 1 and Comparative Examples 1 and 2.

The sintered body thus obtained was measured with respect to sintering shrinkage and three-point bending strength according to JIS. The results are shown in FIG. 16.

Comparative Example 1

96.5 weight % (in terms of $Si_3N_4$) of silicon powder having an average particle size of 1 μm and a maximum particle size of 5 μm was mixed with 2.5 weight % of $Y_2O_3$ powder and 1 weight % of $Al_2O_3$ powder as sintering aids. The mixture was nitrogenated at 1300° C. for 2 hours and then sintered at 1950° C. for 4 hours in a nitrogen atmosphere. The resultant sintered body was measured with respect to sintering shrinkage and three-point bending strength at 1200° C. in the same manner as in Example 1. The results are shown in FIG. 16.

Comparative Example 2

93.0 weight % (in terms of $Si_3N_4$) of silicon powder having an average particle size of 0.5 μm and a maximum particle size of 2 μm was mixed with 5 weight % of $Y_2O_3$ powder and 2 weight % of $Al_2O_3$ powder as sintering aids. The mixture was nitrogenated at 1400° C. for 4 hours and then sintered at 1950° C. for 4 hours in a nitrogen atmosphere. The resultant sintered body was measured with respect to sintering shrinkage and three-point bending strength at 1200° C. in the same manner as in Example 1. The results are shown in FIG. 16.

EXAMPLE 2

By the same method as in Example 1, three types of green body parts each having a thickness of at most 6 mm as shown in FIG. 4 were prepared. These three types of green body parts were assembled in the form of a final article as shown in FIG. 3 by simple contact with each other without using any bonding materials, and held by an appropriate hold means.

The parts thus assembled were nitrogenated and then sintered by the same method as in Example 1 so that an integral silicon nitride sintered body was obtained. The sintered body was measured with respect to sintering shrinkage. The sintering shrinkage of each part was 5% or less, and the green body parts were rigidly bonded to each other.

EXAMPLE 3

Figure 17:
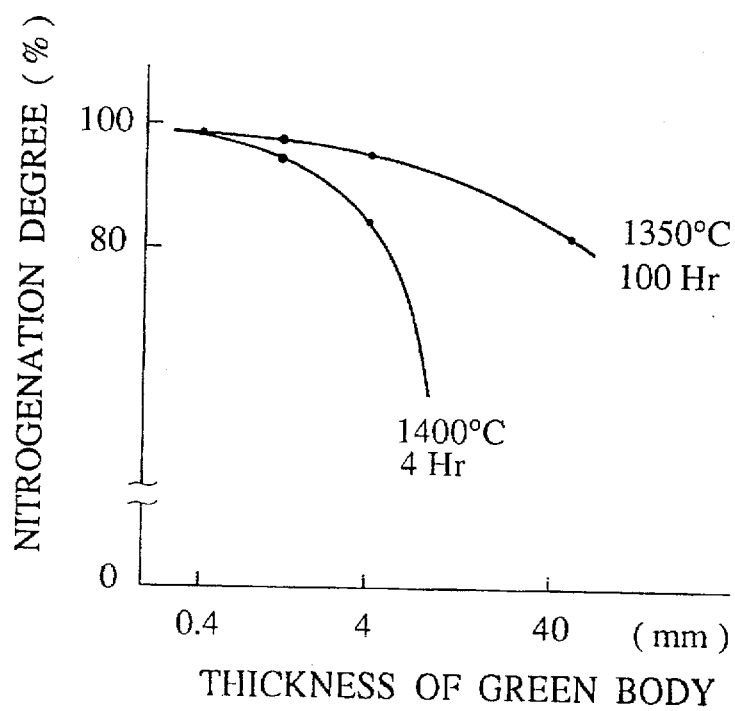
FIG. 17 is a graph showing the relation between a thickness and a nitrogenation degree of the green body.

To determine the relation between a thickness of the green body and a nitrogenation degree, a plurality of plates having various thicknesses ranging from 0.4 mm to 40 mm were prepared, and those in one group were nitrogenated at 1400° C. for 4 hours and those in the other group were nitrogenated at 1350° C. for 100 hours. Nitrogenation degrees (ratio of conversion of silicon to silicon nitride) of the samples were calculated from peak values of X-ray charts obtained by X-ray diffraction analysis. The results are shown in FIG. 17. As recognized from FIG. 17, the green body having a thickness of 4 mm or less was well nitrogenated at 1400° C. for 4 hours.

EXAMPLE 4

Figure 18:
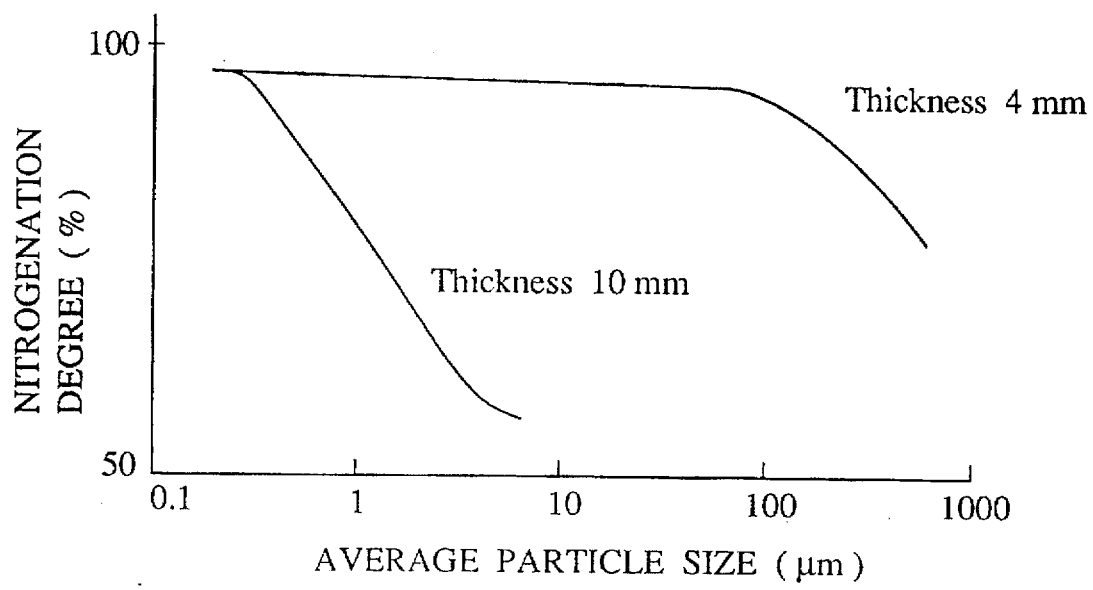
FIG. 18 is a graph showing the relation between an average particle size and a nitrogenation degree of the silicon powder employed for the production of the green body.

To determine the relation between an average particle size distribution of silicon powder used and a density of the green body, a plurality of plates having a thickness of 4 mm were prepared from different silicon powders having different average particle sizes ranging from 5 μm to 300 μm. A plurality of plates having a thickness of 10 mm were separately prepared in the same manner as above. These plates were nitrogenated at 1400° C. for 4 hours and then measured with respect to nitrogenation degree in the same manner as in Example 3. The results are shown in FIG. 18, in which the abscissa indicates an average particle size on a logarithmic scale. As recognized from FIG. 18, the green body having a thickness of 4 mm or less was well nitrogenated at 1400° C. for 4 hours, even though the silicon powder having an average particle size of 5 μm or more was employed. On the other hand, favorable nitrogenation results were not obtained under the above-described condition when the thickness of the green body was 10 mm.

EXAMPLE 5

Figure 19:
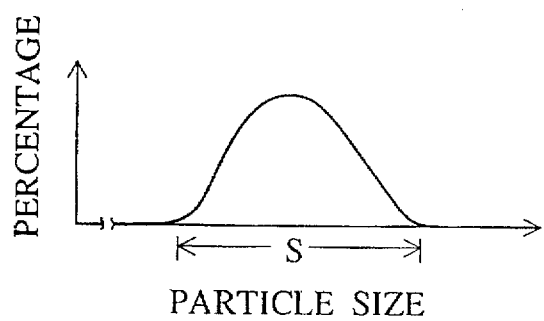
FIGS. 19(a), 19(b), 19(c), and 19(d) are graphs schematically showing particle size distributions of various silicon powders employed in Example 5.
Figure 19:
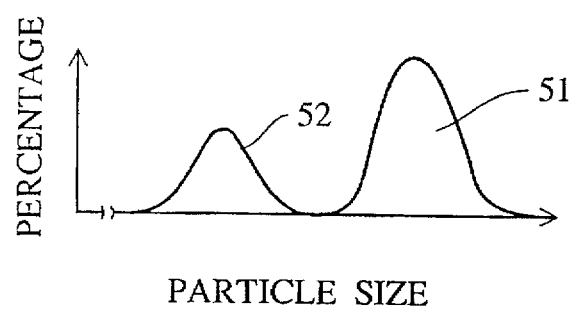
Figure 19:
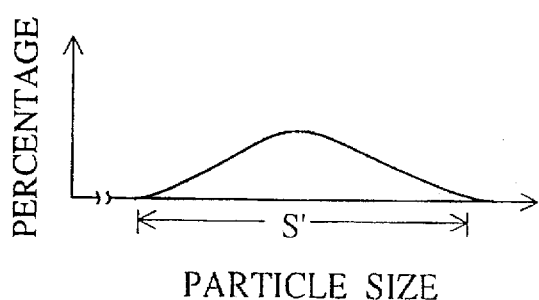
Figure 19:
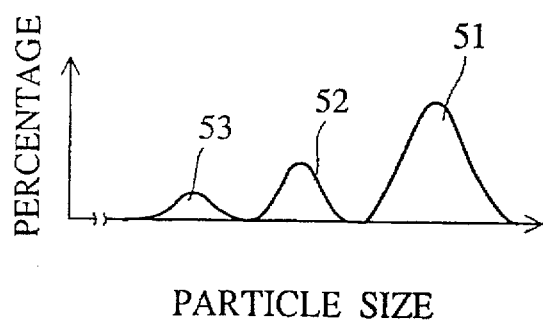

Relation Between Average Particle Size of Silicon Powder and Density of Green Body Plural types of silicon powders having an average particle size ranging from 1 μm to 300 μm were prepared. The silicon powders had different particle size distributions as shown in FIGS. 19(a)–(d), respectively. In the distribution curve indicated in FIG. 19(a), the width S was about 50 μm. In FIG. 19(b), a weight ratio of the silicon powder in a larger particle size distribution range 51 to the silicon powder in a smaller particle size distribution range 52 was 7:3. Furthermore, the distribution width S' shown in FIG. 19(c) was about 70 μm. On the other hand, a weight ratio of the silicon powders in the distribution ranges 51, 52 and 53 in FIG. 19(d) was 7:2:1.

Figure 20:
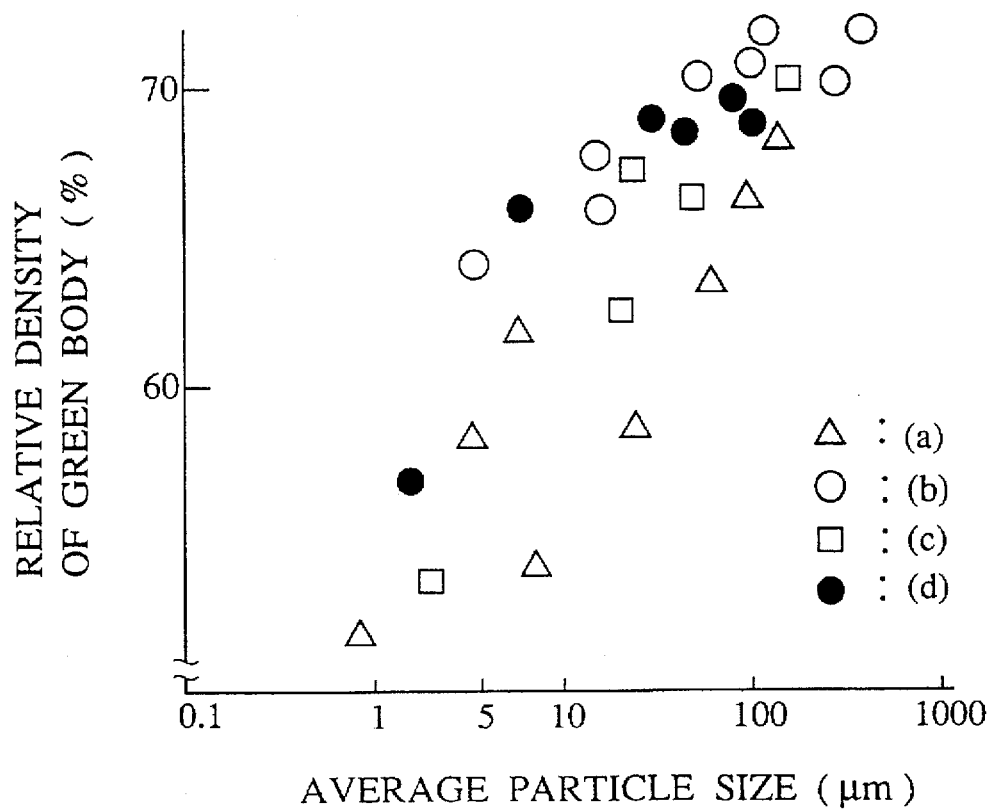
FIG. 20 is a graph showing the relation between an average particle size of silicon powder and a density of the green body.

Using the silicon powders described above, a plurality of green bodies of 30 mm×50 mm×5 mm were prepared. The relation between a relative density of the green body and an average particle size of the silicon powder used are shown in FIG. 20. Incidentally, (a) to (d) in FIG. 20 correspond to cases where the silicon powders in FIG. 19(a)–(d), respectively were used.

As understood from FIG. 20, as the average particle size of the silicon powder employed increases, the relative density of the green body becomes greater. Further, the green body having a greater density was obtained when the silicon powder having a wider range of particle size distribution was used, even though the average particle sizes thereof are identical. Especially, the silicon powder having such a particle size distribution range as shown in FIG. 19(b) has an increased density. Theoretically, a green body having a relative density of 70% exhibits a sintering shrinkage of 5%, and that having a relative density of 60% exhibits a sintering shrinkage of 10%.

EXAMPLE 6

25.0 weight % (in terms of $Si_3N_4$) of silicon powder having an average particle size of 5 μm, 57.5 weight % (in terms of $Si_3N_4$) of silicon powder having an average particle size of 40 μm, 10.0 weight % of $\alpha$-$Si_3N_4$ powder and 7.5 weight % of $Y_2O_3$ powder were ball-milled for 18 hours. The resulting admixture was dried and then formed into a preliminary green body of 55 mm×35 mm×6 mm. The preliminary green body was subjected to a cold isostatic pressing (CIP) at 3000 kg/cm² and then nitrogenated at 1400° C. for 4 hours in a nitrogen atmosphere at 9 kg/cm². The nitrogenated green body was then sintered at 1900° C. for 4 hours in a nitrogen atmosphere at 9 kg/cm².

EXAMPLE 7

Mixing, drying, preliminary molding, cold isostatic pressing, nitrogenating and sintering were carried out in the same manner as in Example 6 except that 25.0 weight % (in terms of $Si_3N_4$) of silicon powder having an average particle size of 5 μm, 57.0 weight % (in terms of $Si_3N_4$) of silicon powder having an average particle size of 40 μm, 10.0 weight % of $\alpha$-$Si_3N_4$ powder and 8.0 weight % of $Y_2O_3$ powder were used as starting materials.

EXAMPLE 8

Mixing, drying, preliminary molding, cold isostatic pressing, nitrogenating, and sintering were carried out in the same manner as in Example 6 except that 25.5 weight % (in terms of $Si_3N_4$) of silicon powder having an average particle size of 5 μm, 59.5 weight % (in terms of $Si_3N_4$) of silicon powder having an average particle size of 40 μm, 10.0 weight % of $\alpha$-$Si_3N_4$ powder and 5.0 weight % of $Y_2O_3$ powder were used as starting materials.

EXAMPLE 9

Mixing, drying, preliminary molding, cold isostatic pressing, nitrogenating and sintering were carried out in the same manner as in Example 6 except that 28.0 weight % (in terms of $Si_3N_4$) of silicon powder having an average particle size of 5 μm, 64.0 weight % (in terms of $Si_3N_4$) of silicon powder having an average particle size of 40 μm and 8.0 weight % of $Y_2O_3$ powder were used as starting materials without $Si_3N_4$ powder.

EXAMPLE 10

Mixing, drying, preliminary molding, cold isostatic pressing, nitrogenating and sintering were carried out in the same manner as in Example 6 except that 29.0 weight % (in terms of $Si_3N_4$) of silicon powder having an average particle size of 5 μm, 67.5 weight % (in terms of $Si_3N_4$) of silicon powder having an average particle size of 40 μm, 2.5 weight % of $Y_2O_3$ powder and 1.0 weight % of $Al_2O_3$ powder were used as starting materials.

The sintered bodies thus obtained were measured with respect to a bending strength at 1300° C. and a $Y_2Si_3N_4O_3$ phase by a powder X-ray diffractometer. The results are shown in Table 1 in which the presence or absence of a $Y_2Si_3N_4O_3$ phase is marked with "Yes" and "No."

TABLE 1

| No. | Silicon Powder | | $Si_3N_4$ | $Y_2O_3$ | $Al_2O_3$ |
| --- | --- | --- | --- | --- | --- |
| | 5 μm | 40 μm | | | |
| Example 6 | 25 | 57.5 | 10 | 7.5 | — |
| Example 7 | 25 | 57.0 | 10 | 8.0 | — |
| Example 8 | 25.5 | 59.5 | 10 | 5.0 | — |
| Example 9 | 28 | 64.0 | — | 8.0 | — |
| Example 10 | 29 | 67.5 | — | 2.5 | 1.0 |

| No. | Sintered Body | |
| --- | --- | --- |
| | Bending Strength at 1300° C. (MPa) | $Y_2Si_3N_4O_3$ |
| Example 6 | 383 | Yes |
| Example 7 | 276 | Yes |
| Example 8 | 288 | Yes |
| Example 9 | 134 | Yes |
| Example 10 | 198 | No |

The sintered bodies of Examples 6–8 have a bending strength of 276–383 MPa at 1300° C., while those of Examples 9 and 10 have a lower bending strength of 134–198 MPa at 1300° C. This appears to be due to the fact that a large amount of $Y_2Si_3N_4O_3$ phase was formed in the sintered bodies of Examples 6–8.

EXAMPLE 11

A silicon powder mixture of silicon powder having an average particle size of 33.6 μm and a particle size distribution range of 15–70 μm and silicon powder having an average particle size of 3.5 μm and a particle size distribution range of 1–10 μm was mixed with $Y_2O_3$ powder having an average particle size of 1.4 μm, and MgO powder having an average particle size ranging from 0.3 μm to 0.5 μm as sintering aids, and with α-Si₃N₄ powder having an average particle size ranging from 0.4 μm to 0.5 μm as a moldability improver component in the proportions shown in Table 2 below.

TABLE 2

| Component | Weight % |
| --- | --- |
| Silicon Powder | |
| Large Powder (Av.: 33.6 μm) | 55.4[1] |
| Small Powder (Av.: 3.5 μm) | 23.8[1] |
| α-Si₃N₄ Powder | 8.8 |
| Sintering Aid | |
| Y₂O₃ Powder | 7.0 |
| MgO Powder | 5.0 |

Note:
[1] Expressed in terms of Si₃N₄.

Added to 100 parts by weight of the powder mixture were 80 parts by weight of ethanol and 80 parts by weight of a ball. The mixture was then charged into a 2-liter polyethylene ball mill pot and ball-milled therein at 170 rpm for 18 hours. The ball-milled mixture was dried by a rotary evaporator and subjected to a cold isostatic pressing (CIP) at 3000 kg/cm² to produce a green body of 30 mm×50 mm×5 mm. After drying, the green body was nitrogenated at 1450° C. in a nitrogen atmosphere at 9 kg/cm² for 4 hours.

The nitrogenated green body was buried in a powder mixture of silicon powder having an average particle size of 26.2 μm and α-Si₃N₄ powder having an average particle size of 0.4 to 0.5 μm at a weight ratio of 1:9 for preventing surface roughing, heated to 1700° C. and maintained at that temperature for 4 hours to obtain a sintered body.

The as-sintered body which was not subjected to surface working was measured with respect to three-point bending strength at room temperature and at 1300° C. according to JIS. The results are shown in Table 7.

EXAMPLE 12

Added as sintering aids to the silicon powder mixture obtained in the same manner as in Example 11 were Y₂O₃ powder, MgO powder and α-Si₃N₄ powder at the proportions indicated in Table 3. The powder mixture thus obtained was ball-milled, dried, molded, nitrogenated and sintered in the same manner as in Example 11 to obtain a silicon nitride sintered body. A three-point bending strength of the sintered body was measured at room temperature and at 1300° C. in the same manner as in Example 1. The results are also shown in Table 7.

TABLE 3

| Component | Weight % |
| --- | --- |
| Silicon Powder | |
| Large Powder (Av.: 33.6 μm) | 56.7[1] |
| Small Powder (Av.: 3.5 μm) | 24.3[1] |
| α-Si₃N₄ Powder | 9.0 |
| Sintering Aid | |
| Y₂O₃ Powder | 5.0 |
| MgO Powder | 5.0 |

Note:
[1] Expressed in terms of Si₃N₄

Comparative Example 3

Silicon powder having an average particle size of 26.2 μm was mixed with Y₂O₃ powder, Al₂O₃ powder as sintering aids, and with α-Si₃N₄ powder at the proportions indicated in Table 4. The powder mixture was then subjected to ball-milling, molding and nitrogenating in the same manner as in Example 11. Thereafter, the nitrogenated green body was sintered at 1900° C. in a nitrogen atmosphere at 9 kg/cm² for 4 hours to obtain a silicon nitride reaction-sintered body. The resultant reaction-sintered body was subjected to a measurement of a three-point bending strength at room temperature and at 1300° C. in the same manner as in Example 11. The results are shown in Table 7.

TABLE 4

| Component | Weight % |
| --- | --- |
| Silicon Powder (Av.: 26.2 μm) | 87.7[1] |
| α-Si₃N₄ Powder | 8.8 |
| Sintering Aid | |
| Y₂O₃ Powder | 2.5 |
| Al₂O₃ Powder | 1.0 |

Note:
[1] Expressed in terms of Si₃N₄.

Comparative Example 4

In the same manner as in Example 11, silicon powder having an average particle size of 5.9 μm was mixed with Y₂O₃ powder, Al₂O₃ powder as sintering aids and α-Si₃N₄ powder at the proportions indicated in Table 5. The powder mixture was then subjected to ball-milling, molding, and nitrogenating in the same manner as in Example 11. Thereafter, the nitrogenated green body was sintered at 1900° C. in a nitrogen atmosphere at 9 kg/cm² for 4 hours to obtain a silicon nitride reaction-sintered body. The resultant sintered body was subjected to a measurement of a three-point bending strength fit room temperature and 1300° C. in the same manner as in Example 11, The results are shown in Table 7.

TABLE 5

| Component | Weight % |
| --- | --- |
| Silicon Powder (Av.: 5.9 μm) | 86.8[1] |
| α-Si₃N₄ Powder | 9.7 |
| Sintering Aid | |
| Y₂O₃ Powder | 2.5 |
| Al₂O₃ Powder | 1.0 |

Note:
[1] Expressed in terms of Si₃N₄.

EXAMPLE 13

Added to the silicon powder mixture obtained in the same manner as in Example 11 was sintering aids including Y₂O₃ powder, and Al₂O₃ powder and α-Si₃N₄ powder at the proportions indicated in Table 6. The powder mixture was then subjected to ball-milling, molding and nitrogenating in the same manner as in Example 11. Thereafter, the nitrogenated green body was sintered at 1900° C. in a nitrogen atmosphere at 9 kg/cm² for 4 hours to obtain a silicon nitride reaction-sintered body. The resultant sintered body was subjected to a measurement of a three-point bending strength at room temperature and at 1300° C. in the same manner as in Example 11. The results are shown in Table 7.

TABLE 6

| Component | Weight % |
| --- | --- |
| Silicon Powder | |
| Large Powder (Av.: 33.6 μm) | 60.8[1] |
| Small Powder (Av.: 3.5 μm) | 26.0[1] |
| α-$Si_3N_4$ Powder | 9.7 |
| Sintering Aid | |
| $Y_2O_3$ Powder | 2.5 |
| $Al_2O_3$ Powder | 1.0 |

Note:
[1]Expressed in terms of $Si_3N_4$.

TABLE 7

| No. | Density of Green Body (%)[1] | Nitrogenation Degree (%)[2] | Strength (MPa)[3] | | Sintering Conditions | |
| --- | --- | --- | --- | --- | --- | --- |
| | | | At Room Temp. | At 1300° C. | Temp. (°C.) | Time (hr.) |
| Example | | | | | | |
| 11 | 70.7 | 96 | 610 | 405 | 1700 | 4 |
| 12 | 71.3 | 98 | 590 | 415 | 1700 | 4 |
| 13 | 70.4 | 95 | 492 | 350 | 1900 | 4 |
| Comparative Example | | | | | | |
| 3 | 66.0 | 95 | 420 | 287 | 1900 | 4 |
| 4 | 65.2 | 98 | 436 | — | 1900 | 4 |

Note:
[1]Expressed as percentage relative to theoretical density.
[2]Determined from a peak ratio in X-ray diffraction pattern.
[3]Three-point bending strength was measured on the as-sintered body without surface working according to JIS.

As is apparent from Table 7, the green body obtained according to the present invention has an increased density by using the silicon powder mixture having a greater average particle size.

EXAMPLE 14

95.5 weight % (in terms of $Si_3N_4$) of silicon powder having an average particle size of 20 μm, 2.5 weight % of $Y_2O_3$ powder having an average particle size of 1 μm and a maximum particle size of 5 μm, 1 weight % of $Al_2O_3$ powder having an average particle size of 0.8 μm and a maximum particle size of 5 μm as sintering aids, and 1 weight % of cobalt powder were introduced into a 2-liter polyethylene ball mill pot. Further added to 100 parts by weight of the powder mixture was 80 parts by weight of ethanol. The mixture was then ball-milled for 18 hours. The resulting admixture was dried by a rotary evaporator and subjected to cold isostatic pressing (CIP) at 3000 kg/cm² to obtain a green body of 30 mm×50 mm×5 mm. The green body was then nitrogenated at 1450° C. for 4 hours in a nitrogen atmosphere at 9 kg/cm². After the nitrogenation, the partly sintered body (hereinafter referred to as "calcinated body") was subjected to X-ray diffraction measurements to determine a nitrogenation degree thereof. The results are shown in Table 8.

The calcinated body was sintered at 1950° C. in a nitrogen atmosphere at 9 kg/cm² to obtain a sintered body which was then subjected to an X-ray diffraction measurement. As a result, it was confirmed that the nitrogenation degree of the sintered body was 100%.

EXAMPLE 15

A green body was prepared in the same manner as in Example 14 except that the amount of cobalt powder used was changed to 3 weight % and the amount of silicon powder was decreased correspondingly. The green body was nitrogenated in the same manner as in Example 14 to obtain a calcinated body, which was subjected to an X-ray diffraction measurement to determine a nitrogenation degree thereof. The results are also shown in Table 8. The calcinated body was then sintered under the condition identical with Example 14 to obtain a sintered body which was subjected to an X-ray diffraction measurement. As a result, it was confirmed that the nitrogenation of the sintered body was 100%.

EXAMPLE 16

A green body was prepared in the same manner as in Example 14 except that 1 weight % of $Cr_2O_3$ powder was used instead of the cobalt powder. The green body was nitrogenated in the same manner as in Example 14 to obtain a calcinated body, which was subjected to an X-ray diffraction measurement to determine a nitrogenation degree thereof. The results are also shown in Table 8. The calcinated body was then sintered under the condition identical with Example 14 to obtain a sintered body which was subjected to an X-ray diffraction measurement. As a result, it was confirmed that the nitrogenation of the sintered body was 100%.

EXAMPLE 17

A green body was prepared in the same manner as in Example 14 except that 3 weight % of $Cr_2O_3$ powder was used instead of the cobalt powder and that the amount of the silicon powder was decreased correspondingly. The green body was nitrogenated in the same manner as in Example 14 to obtain a calcinated body, which was subjected to an X-ray diffraction measurement to determine a nitrogenation degree thereof. The results are also shown in Table 8. The calcinated body was then sintered under the condition identical with Example 14 to obtain a sintered body which was subjected to an X-ray diffraction measurement. As a result, it was confirmed that the nitrogenation of the sintered body was 100%.

Comparative Example 5

A green body was prepared in the same manner as in Example 14 except that the cobalt powder was not used and that the amount of the silicon powder was increased correspondingly. The green body was nitrogenated in the same manner as in Example 14 to obtain a calcinated body. The calcinated body was subjected to an X-ray diffraction measurement to determine a nitrogenation degree thereof. The results are also shown in Table 8. The calcinated body was then sintered under the condition identical with Example 1 to obtain the sintered body which was subjected to an X-ray diffraction measurement. As a result, it was confirmed that the nitrogenation of the sintered body was 94.8%.

Comparative Example 6

A green body was prepared in the same manner as in Example 14 except that the cobalt powder (nitrogenation accelerator) was not used and that the amount of the $Y_2O_3$ powder was increased correspondingly. The green body was nitrogenated in the same manner as in Example 14 to obtain a calcinated body. The calcinated body was subjected to an X-ray diffraction measurement to determine a nitrogenation degree thereof. The results are also shown in Table 8. The calcinated body was then sintered under the condition identical with Example 14 to obtain a sintered body which was subjected to an X-ray diffraction measurement. As a result, it was confirmed that the nitrogenation of the sintered body was 94.5%.

TABLE 8

| No. | Density of Green Body (%)[1] | Nitrogenation Degree (%)[2] |
| --- | --- | --- |
| Example | | |
| 14 | 95.3 | 100 |
| 15 | 96.1 | 100 |
| 16 | 97.2 | 100 |
| 17 | 100 | 100 |
| Comparative Example | | |
| 5 | 93.9 | 94.8 |
| 6 | 92.7 | 94.5 |

Note:
[1],[2]Determined from a peak ratio in X-ray diffraction pattern.

Comparative Example 7

A green body was prepared in the same manner as in Example 14 except that 1 weight % of an oxide powder of Mn or Hf having a valence of +4 was used instead of the cobalt powder (nitrogenation accelerator). The green body was nitrogenated in the same manner as in Example 14 to obtain a calcinated body. The calcinated body was subjected to an X-ray diffraction measurement to determine a nitrogenation degree thereof. The results are shown in Table 9.

TABLE 9

| Metal Oxide[1] | Nitrogenation Degree of Calcinated Body |
| --- | --- |
| Mn | 88.2 |
| Hf | 77.7 |

Note:
[1]Expressed by a metal element.

EXAMPLE 18

99 weight % (in terms of $Si_3N_4$) of silicon powder having an average particle size of 20 μm and a purity of 99.9%, 0.5 weight % of $Fe_2O_3$ powder having an average particle size of 1 μm and a maximum particle size of 5 μm and 0.5 weight % of $TiO_2$ powder having an average particle size of 1 μm and a maximum particle size of 5 μm were introduced into a 2-liter polyethylene ball mill pot. Further added to the mixture was 80 parts by weight of ethanol based on 100 parts by weight of the powder mixture. The mixture was then ball-milled for 18 hours.

The resulting admixture was dried by a rotary evaporator and subjected to a cold isostatic pressing (CIP) at 3000 kg/cm² to obtain a green body of 30 mm×50 mm×5 mm. The green body was then nitrogenated at 1400° C. for 4 hours in a nitrogen atmosphere at 9 kg/cm². After the nitrogenation, the resultant calcinated body was subjected to an X-ray diffraction measurements to determine a nitrogenation degree thereof and a weight ratio of $\alpha$-$Si_3N_4$ to ($\alpha$-$Si_3N_4$+ $\beta$-$Si_3N_4$) (hereinafter referred to as "$\alpha$ ratio"). The results are shown in Table 11.

EXAMPLE 19

A green body was prepared in the same manner as in Example 18 by using 88 weight % of silicon powder mixture prepared by mixing silicon powders A and B at a mixing ratio indicated in Table 10, 1 weight % of $Fe_2O_3$ powder (average particle size: 1 μm, maximum particle size: 5 μm), 1 weight % of $TiO_2$ powder (average particle size: 1 μm, maximum particle size: 5 μm), and 10 weight % of $Y_2O_3$ powder (average particle size: 1 μm, maximum particle size: 5 μm).

TABLE 10

| | Particle Size (μm) | | | |
| --- | --- | --- | --- | --- |
| silicon powder | Average | Maximum | Minimum | Weight % |
| A | 30 | 60 | 15 | 70 |
| B | 3 | 10 | 1 | 30 |

The green body was nitrogenated in the same manner as in Example 18 to obtain a calcinated body. The calcinated body was subjected to an X-ray diffraction measurement to determine a nitrogenation degree and an $\alpha$-ratio. The results are also shown in Table 11. The calcinated body was sintered at 1950° C. for 4 hours in a nitrogen atmosphere at 9 kg/cm² to obtain a sintered body which was then subjected to an X-ray diffraction measurements in the same manner as above to determine a nitrogenation degree thereof. As a result, it was confirmed that the nitrogenation degree of the sintered body was 99.6%. Furthermore, a density and three-point bending strength at room temperature and 1300° C. were measured according to JIS. The results are shown in Table 12.

EXAMPLE 20

A green body was prepared in the same manner as in Example 19 and then heated at 1450° C. for 4 hours in an atmosphere of 90 volume % of nitrogen and 10 volume % of hydrogen at 9 kg/cm² to obtain a nitrogenated body (calcinated body). The calcinated body was subjected to an X-ray diffraction measurement to determine a nitrogenation degree thereof. The results are also shown in Table 11. The calcinated body was then sintered under the condition identical with Example 19 to obtain a sintered body which was subjected to an X-ray diffraction measurement. As a result, it was confirmed that the nitrogenation of the sintered body was 99.6%. Furthermore, the density and bending strength of the sintered body were measured in the same manner as in Example 19. The results are shown in Table 12.

EXAMPLE 21

A green body was prepared in the same manner as in Example 18 except that $TiO_2$ powder was not used and that the amount of $Fe_2O_3$ powder was increased correspondingly. The green body was nitrogenated in the same manner as in Example 18 to obtain a calcinated body. The calcinated body was subjected to an X-ray diffraction measurement to determine a nitrogenation degree and $\alpha$-ratios thereof. The results are also shown in Table 11.

EXAMPLE 22

A green body was prepared in the same manner as in Example 18 except that $Fe_2O_3$ powder was not used and that the amount of $TiO_2$ powder was increased correspondingly. The green body was nitrogenated in the same manner as in Example 18 to obtain a calcinated body. The calcinated body was subjected to an X-ray diffraction measurement to determine a nitrogenation degree and α-ratios thereof. The results are shown in Table 11.

EXAMPLE 23

A green body was prepared in the same manner as in Example 19 without $Fe_2O_3$ powder and $TiO_2$ powder, and the amount of the silicon powder was increased correspondingly. The green body was nitrogenated to measure a nitrogenation degree and an α-ratio. The results are also shown in Table 11. The calcinated body was then sintered under the condition identical with Example 19 to obtain a sintered body which was subjected to an X-ray diffraction measurement. As a result, it was confirmed that the nitrogenation degree of the sintered body was 97%. Furthermore, the density and bending strength of the sintered body were measured. The results are shown in Table 12.

TABLE 11

| Ex. No. | Nitrogenation Degree (%)[1] | α Ratio (%)[2] | Additives[3] |
| --- | --- | --- | --- |
| 18 | 80.6 | 89.3 | Fe + Ti |
| 19 | 96.2 | 60.0 | Fe + Ti + Y |
| 20 | 95.6 | 70.3 | Fe + Ti + Y |
| 21 | 85.0 | 77.6 | Fe only |
| 22 | 59.3 | 28.0 | Ti only |
| 23 | 84.1 | 52.8 | Y only |

Note:
[1] Determined from a peak height in X-ray diffraction pattern on the calcinated body.
[2] $[\alpha\text{-}Si_3N_4/(\alpha\text{-}Si_3N_4 + \beta\text{-}Si_3N_4)] \times 100(\%)$ Determined from peaks of $\alpha\text{-}Si_3N_4$ and $\beta\text{-}Si_3N_4$ in X-ray diffraction pattern. $\alpha\text{-}Si_3N_4$ is represented by the total of peaks at (102) and (210), and $\beta\text{-}Si_3N_4$ is represented by the total of peaks at (101) and (210).
[3] Expressed by a metal element.

TABLE 12

| Example No. | Density of Sintered Body (g/cm³) | Bending Strength (kg/mm²)[1] | |
| --- | --- | --- | --- |
| | | At Room Temp. | At 1300° C. |
| 19 | 3.11 | 376 | 311 |
| 20 | 3.16 | 526 | 420 |
| 23 | 3.01 | 294 | 195 |

Note:
[1] Three-point bending strength.

In a case where $Y_2O_3$ powder is not contained, the α-ratio is low with only Fe or Ti added, but it can be increased by adding both Fe and Ti as is clear from Table 11. In a case where only $Y_2O_3$ powder is contained, the calcinated body has low nitrogenation degree and α-ratio. However, by adding Fe and Ti together with $Y_2O_3$ powder, the calcinated body can be provided with high nitrogenation degree and α-ratio. Further, by using an atmosphere containing a hydrogen gas, the effect of increasing nitrogenation degree and α-ratio can be enhanced.

EXAMPLE 24 and 25

Comparative Example 8
Production of Green Body 270 parts by weight of a first silicon powder having an average particle size of 3.33 μm and a particle size distribution range of 1 μm and 10 μm, 630 parts by weight of a second silicon powder having an average particle size of 41.77 μm and a particle size distribution range of 15 μm and 85 μm, 38.86 parts by weight of $Y_2O_3$ powder having an average particle size of 1 μm and a maximum particle size of 5 μm, and 15.54 parts by weight of $Al_2O_3$ powder having an average particle size of 0.8 μm and a maximum particle size of 5 μm as sintering aids were introduced into a 2-liter polyethylene ball mill pot. Further added to the mixture was 80 parts by weight of ethanol. The mixture was then ball-milled for 18 hours. The resulting mixture was dried by a rotary evaporator and subjected to a cold isostatic pressing (CIP) at 3000 kg/cm² to obtain a plurality of green body parts each having a size of 30 mm×50 mm×5 mm.

Production of Bonding Material 96.5 weight % (in terms of $Si_3N_4$) of silicon powder having an average particle size of 4.33 μm (Example 24), 0.50 μm (Example 25) or 16.16 μm (Comparative Example 8), 2.5 weight % of $Y_2O_3$ powder having an average particle size of 1.5 μm and 1 weight % of $Al_2O_3$ powder having an average particle size of 0.8 μm were introduced into an aluminum ball mill pot. 100 parts by weight of the powder mixture was then mixed with 80 parts by weight of ethanol. The resultant mixture was then ball-milled with silicon nitride balls for 16 hours. The resulting mixture was dried by a rotary evaporator to obtain a powder mixture for a bonding material. 99.5 weight % of a water/ethanol mixture at a ratio of 1:1 and 0.5 weight % of PVA were mixed by a magnetic stirrer under heated condition. 12 parts by weight of the resulting solution was added to 20 parts by weight of the above powder mixture and sufficiently blended to prepare a bonding material.

Bonding, Nitrogenation and Sintering

Figure 21:
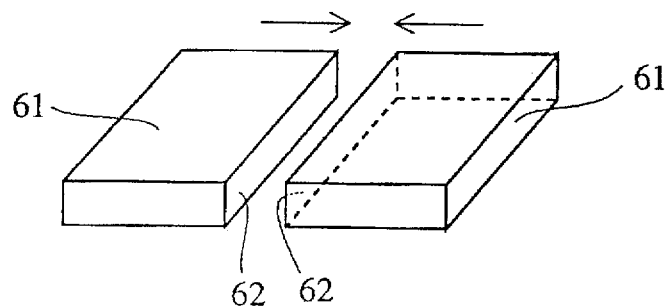
FIG. 21 is a perspective view showing a bonding portion of the green body.
Figure 22:
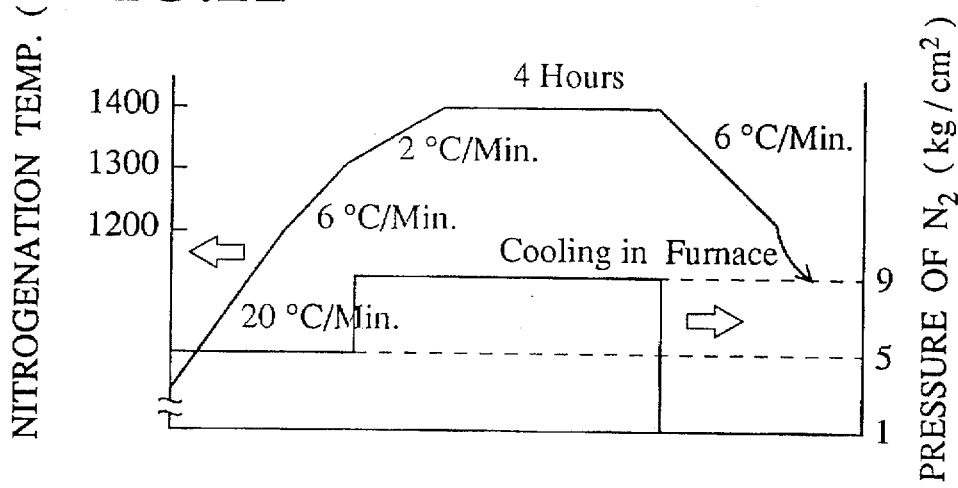
FIG. 22 is a graph showing the nitrogenation conditions in Examples 24 and 25 and Comparative Examples 8 and 9.
Figure 23:
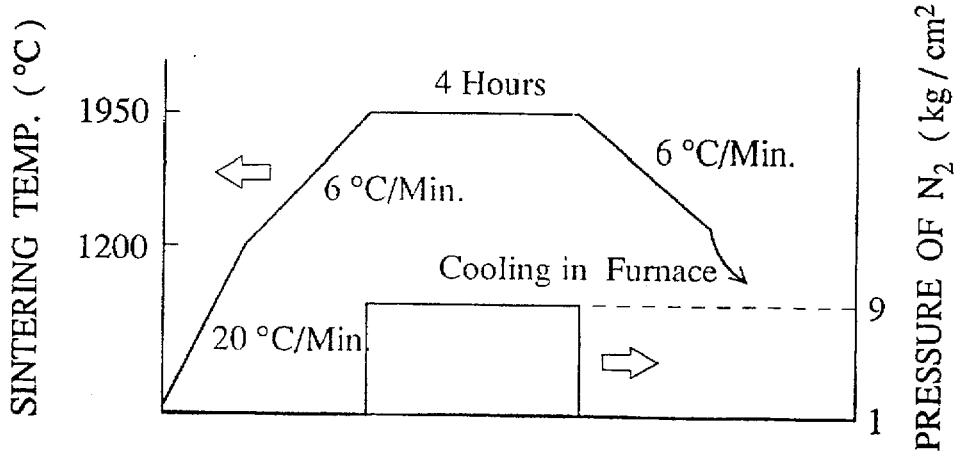
FIG. 23 is a graph showing the sintering conditions in Examples 24 and 25 and Comparative Examples 8 and 9.

Two green body parts 61, 61 obtained above were sufficiently impregnated with ethanol, and the bonding material was applied to end surfaces 62 of the green body parts 61, 61 as shown in FIG. 21. The green body parts 61, 61 were then bonded together with the opposing surfaces 62, 62 in contact with each other. The parts thus bonded were nitrogenated under the conditions shown in FIG. 22, and then sintered under the conditions described in FIG. 23 to obtain an integral sintered body of silicon nitride.

Figure 24:
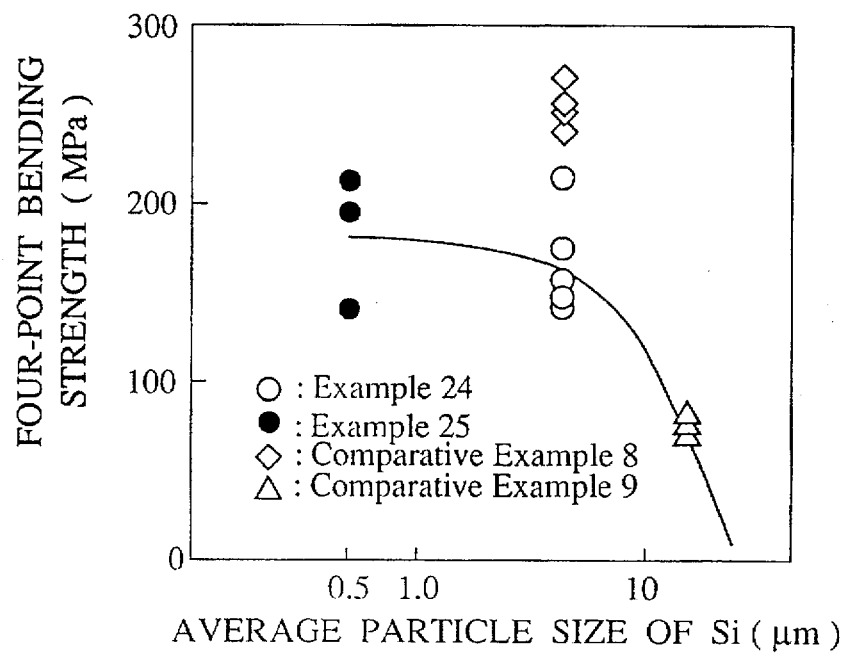
FIG. 24 is a graph showing the relation between a four-point bending strength and an average particle size of silicon powder in the bonding material in Examples 24 and 25 and Comparative Examples 8 and 9.
Figure 25:
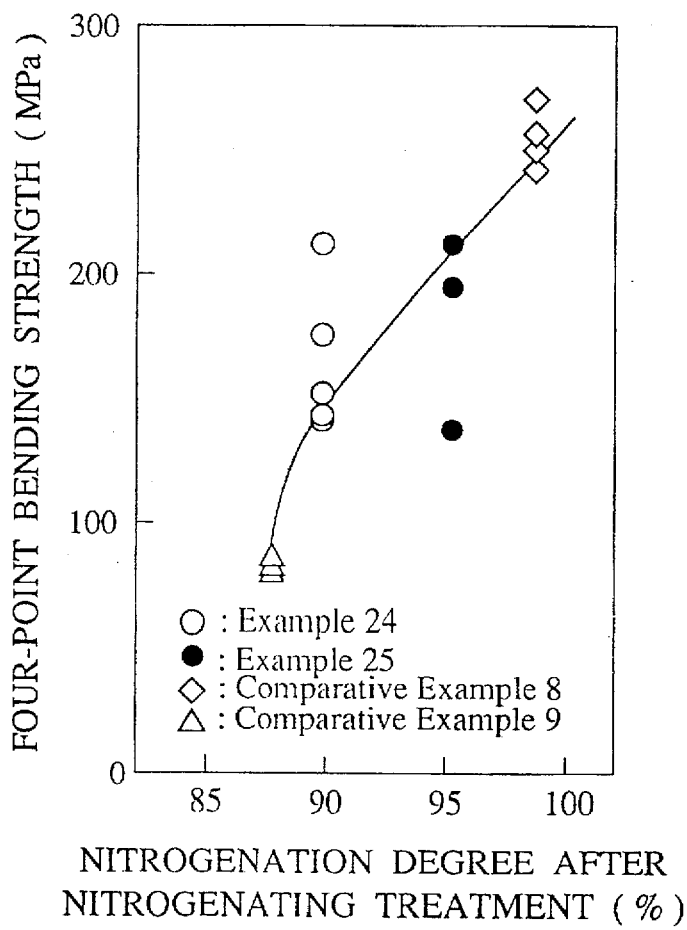
FIG. 25 is a graph showing the relation between a four-point bending strength and a nitrogenation degree immediately after the nitrogenation treatment in Examples 24 and 25 and Comparative Examples 8 and 9.

The resultant silicon nitride reaction-sintered body was cut along lines perpendicular to the bonding surfaces into a plurality of bar-shaped samples each having a size of 3 mm×4 mm×40 mm. The samples were subjected to a JIS four-point bending test to measure a mechanical strength thereof. The results are shown in Table 13 and FIG. 24. In FIG. 24, the abscissa indicates an average particle size of silicon powder in the bonding material. Further, the relation between nitrogenation degree just after nitrogenation and four-point bending strength is shown in FIG. 25.

Comparative Example 9

A bonded silicon nitride reaction-sintered body was prepared in the same manner as in Example 24 except for using only one kind of silicon powder having an average particle size of 16.16 μm instead of the mixture of two types of silicon powders having different average particle sizes. The resultant sintered body was cut in the same manner as in Example 24 to obtain the samples which were then subjected to the JIS four-point bending test. The results are also shown in Table 13 and FIGS. 24 and 25.

TABLE 13

| No. | Average Bending Strength (MPa) | Shrinkage by Sintering (%) | Nitrogenation Degree (%)[1] |
|---|---|---|---|
| Example | | | |
| 24 | 163.8 | 1.54 | 90.2 |
| 25 | 180.0 | 1.59 | 95.1 |
| Comparative Example | | | |
| 8 | 77.1 | 1.64 | 90.3 |
| 9 | 254.1 | 3.5–4.6 | 98.0 |

Note:
[1]Determined from weight change by nitrogenation.

The surfaces of the samples exposed by breakage in the bending test were observed by SEM. The observation indicates that the samples of Examples 24, 25 have a well grown crystalline structure of $\beta$-$Si_3N_4$ which are closely intertwined with each other. On the other hand, the sample of Comparative Example 8 has a smaller amount of the $\beta$-$Si_3N_4$ crystal grains, a lower aspect ratio of the $\beta$-$Si_3N_4$ crystal grains and an non-uniform structure. The sample of Comparative Example 9 suffers from a large sintering shrinkage in spite of a large strength. In each of Examples and Comparative Examples, the samples were broken along the bonding layers.

EXAMPLE 26

Figure 10:
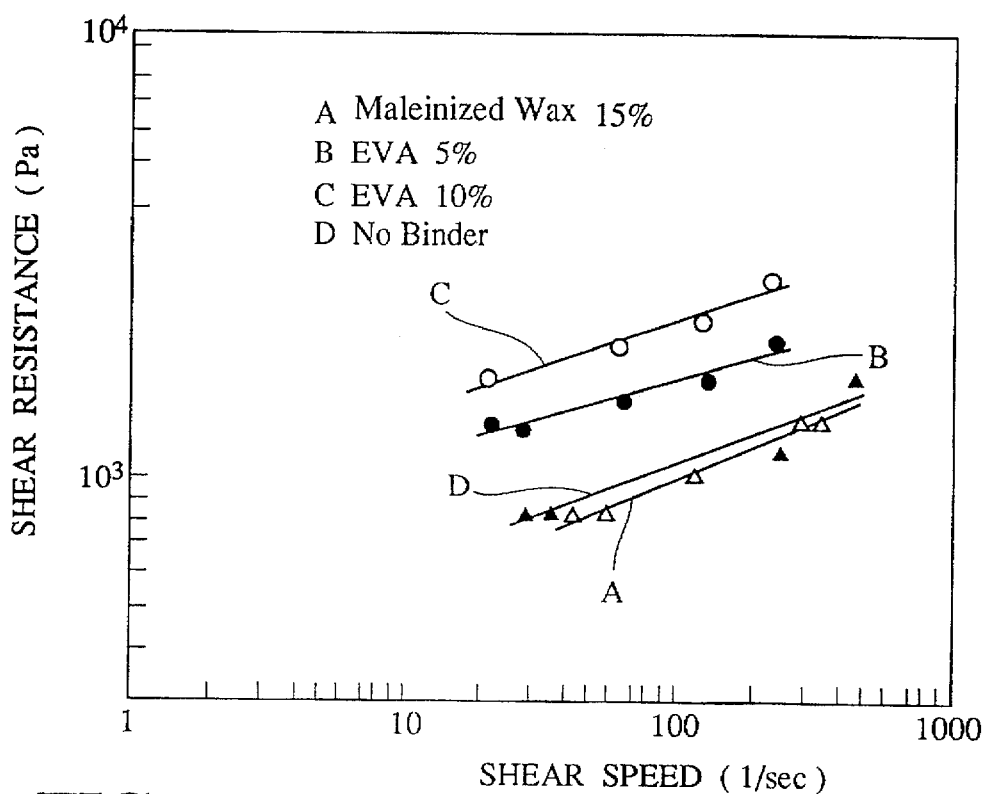
FIG. 10 is a graph showing changes in viscosity of a raw materials when various types of binders are used in Example 26.

To confirm that an injection molding material having a high viscosity can suppress weld marks, comparison was made on ceramic materials containing various binders. The results are shown in FIG. 10 in which the abscissa indicates a shear speed (1/second) and the ordinate indicates a shear resistance. "A" indicates an injection molding material containing 15 volume % of maleinized wax, "B" indicates an injection molding material containing 5 volume % of an ethylene-vinyl acetate copolymer (EVA), "C" indicates an injection molding material containing 10 volume % of an ethylene-vinyl acetate copolymer (EVA), and "D" indicates an injection molding material containing no binder. As is clear from FIG. 10, the ceramic material containing maleinized wax has a low viscosity, thereby showing good flowability and preventing weld marks.

Figure 11:
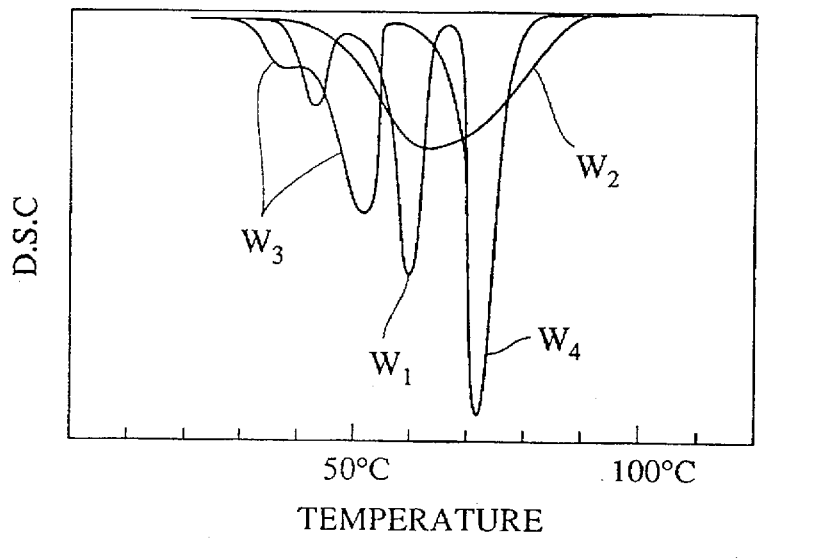
FIG. 11 is a graph showing melting points of various types of binders used in Example 26.

Next, with respect to a binder containing 53 volume % of wax $W_1$, 17 volume % of wax $W_2$, 15 volume % of maleinized wax $W_3$, 10 volume % of stearic acid $W_4$, and 5 volume % of a dispersant $W_5$, the hardening of an injection-molded sample was examined. FIG. 11 shows DSC data of the binder. As shown in FIG. 11, each binder component was slowly solidified in the order of $W_4 \rightarrow W_2 \rightarrow W_1 \rightarrow W_3$ in the cooling process after the molding.

Figure 12:
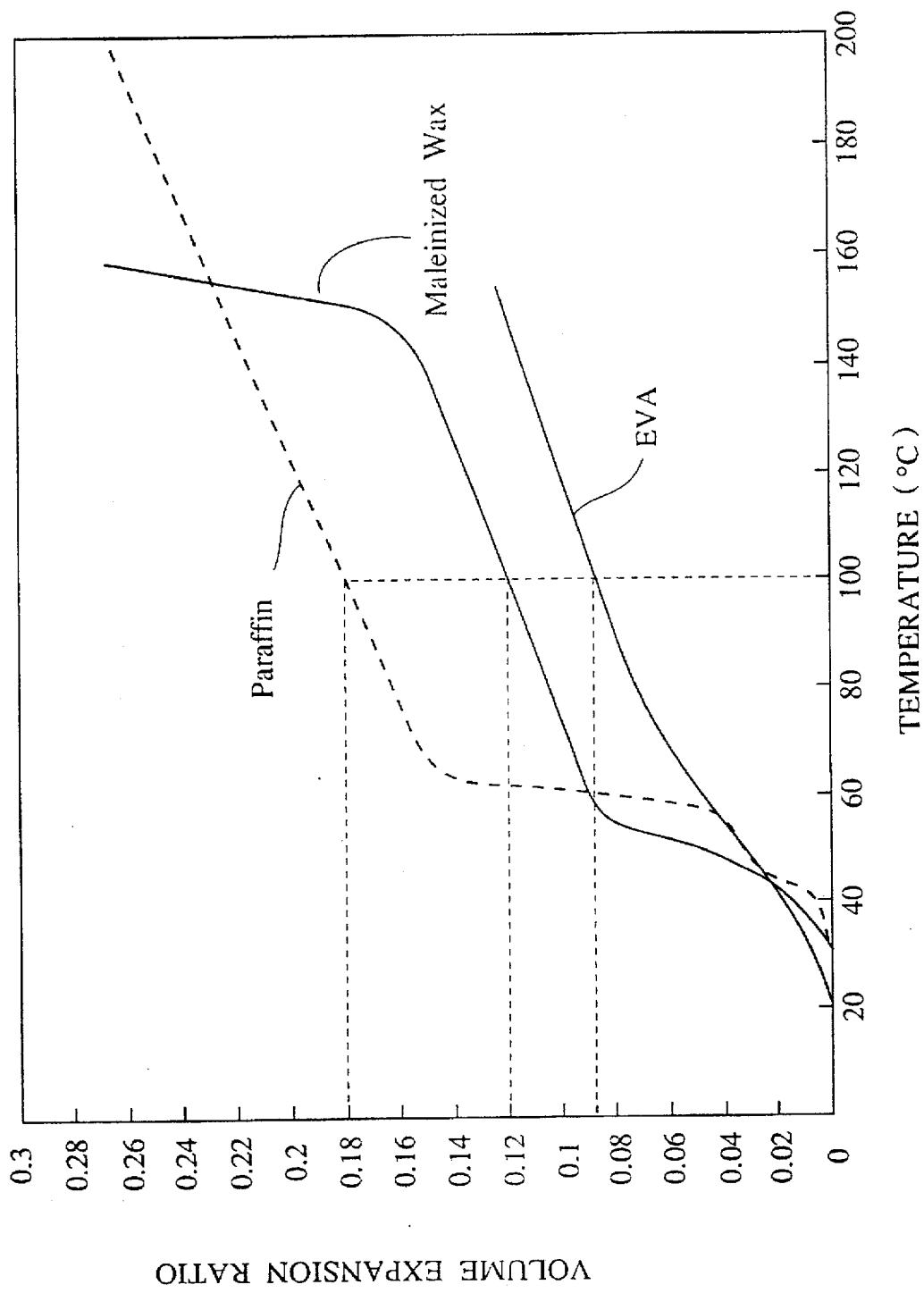
FIG. 12 is a graph showing volume expansion coefficients of various types of binders used in Example 26.

The volume expansion of each binder was measured, and the results fire shown in FIG. 12. Paraffin showed a too large volume expansion, while EVA showed a too high viscosity though its volume expansion is small. The maleinized wax has a desirably small volume expansion.

EXAMPLE 27

By an injection molding process shown in FIG. 9, green bodies were produced from the following ceramic materials, and nitrogenation and sintering were conducted under the following conditions:

Ceramic Powder

| | |
|---|---|
| Silicon powder (average particle size: 3.4 μm): | 21.6 weight %[1], |
| Silicon powder (average particle size: 30 μm): | 50.4 weight %[1], |
| $Si_3N_4$ powder (average particle size: 0.3 μm): | 13.3 weight %, |
| $Y_2O_3$ powder (average particle size: 1.4 μm): | 10.3 weight %, and |
| AlN powder (average particle size: 2.0 μm): | 4.4 weight %. |

Ball Milling

| | |
|---|---|
| Solvent: | ethanol, |
| Pot volume: | 10 liters, |
| Rotation speed: | 50 rpm, and |
| Time: | 64 hours. |

Drying

| | |
|---|---|
| Under vacuum | |
| Temperature: | 150° C., and |
| Time: | 3 hours. |

Blending

| | |
|---|---|
| Binder | Composition as shown in Table 14 (ceramic powder/binder: 40 vol. %/60 vol. %) |
| Type: | Pressurized kneading, |
| Temperature: | 90° C., and |
| Time: | 4 hours. |

Injection Molding

| | |
|---|---|
| Temperature: | 90° C., and |
| Pressure: | 6 kg/cm². |

Degreasing

| | |
|---|---|
| Atmosphere | Air, |
| Temperature: | 500° C., |
| Time: | 100 hours, and |
| Cooling: | Furnace cooling. |

Nitrogenation

| | |
|---|---|
| Atmosphere | Nitrogen gas and 20% of Hydrogen gas, |
| Temperature: | 1450° C., and |
| Time | 4 hours. |

Sintering

| | |
|---|---|
| Atmosphere | Nitrogen gas, |
| Temperature: | 1900° C., and |
| Time | 4 hours. |

Note
[1]Percentage is expressed in terms of $Si_3N_4$.

Test pieces produced under the above conditions were examined with respect to moldability and degreasability. The results are shown in Table 14.

Comparative Examples 10–12

Example 27 was repeated in the same manner except for using the different binder shown in Table 14. Test pieces produced were examined with respect to moldability and degreasability. The results are also shown in Table 14.

TABLE 14

| | Composition of Binder (volume %) | | | |
|---|---|---|---|---|
| No. | Paraffin | Dispersant | MW[1] | EVA |
| Example 27 | 80 | 5 | 15 | 0 |
| Com. Ex. 10 | 95 | 5 | 0 | 0 |
| Com. Ex. 11 | 90 | 5 | 0 | 5 |
| Com. Ex. 12 | 85 | 5 | 0 | 10 |

TABLE 14-continued

| No. | Flowability | Weld Marks | General Evaluation |
|---|---|---|---|
| Example 27 | Good | No | Good |
| Com. Ex. 10 | Good | Yes | Poor |
| Com. Ex. 11 | Poor | Yes | Poor |
| Com. Ex. 12 | Poor | Yes | Poor |

Note:
(1)Maleinized wax.

A ceramic material of Example 27 containing a binder consisting of 80 volume % of paraffin, 5 volume % of a dispersant and 15 volume % of maleinized wax exhibited a good flowability evaluated as "good", and no weld marks appeared on the green body prepared therefrom. On the other hand, ceramic materials containing a binder consisting of 95 volume % of paraffin and 5 volume % of a dispersant in Comparative Examples 10–12 exhibited poor moldability.

EXAMPLES 28–30

Comparative Examples 13 and 14

In the same process as in Example 27, degreasability was evaluated with a formulation of 42.5 volume % of ceramic powder and 57.5 volume % of a binder in which the amount of maleinized wax was changed. The results are shown in Table 15.

TABLE 15

| | Composition of Binder (volume %) | | | |
|---|---|---|---|---|
| No. | Paraffin | Dispersant | MW(1) | ST(2) |
| Example 28 | 79.5 | 5 | 5 | 10.5 |
| Example 29 | 63.5 | 5 | 21.5 | 10.5 |
| Example 30 | 53 | 5 | 31.5 | 10.5 |
| Com. Ex. 13 | 84.5 | 5 | 0 | 10.5 |
| Com. Ex. 14 | 33 | 5 | 51.5 | 10.5 |

| | Sintered Body | | | |
|---|---|---|---|---|
| No. | Degreased Body | Deformation(3) | Cracking | Evaluation |
| Example 28 | Good | 1 | No | Good |
| Example 29 | Good | 0.5 | No | Good |
| Example 30 | Good | 0.1 | No | Good |
| Com. Ex. 13 | Good | ≧1 | Yes | Poor |
| Com. Ex. 14 | Cracked | ≦0.1 | No | Poor |

Note:
(1)Maleinized wax.
(2)Stearic acid.
(3)Unit: mm.

In Examples 28–30 in which a binder containing a proper amount of maleinized wax was used, the degreased body exhibited no cracks and the sintered body showed a low deformation and no cracks. On the other hand, when maleinized wax was not used (Comparative Example 13), or when the amount of the maleinized wax used was too much (Comparative Example 14), either one of the degreased body and the sintered body was cracked. As a result, it is preferred that the content of the maleinized wax in the binder be in the range of 5 to 51 volume %.

EXAMPLES 31–33

86.5 weight % (in terms of $Si_3N_4$) of silicon powder (average particle size: 23 μm), 2.5 weight % of $Y_2O_3$ powder (average particle size: 1.4 μm), 1.0 weight % $Al_2O_3$ powder (average particle size: 2.0 μm) and 10.0 weight % of $Si_3N_4$ powder (average particle size: 0.3 μm) were ball-milled for 18 hours. The resulting admixture was dried and then formed into a calcinated sample of 55 mm×35 mm×6 mm. The calcinated sample was subjected to a cold isostatic pressing (CIP) at 3000 kg/cm² and then nitrogenated at 1400° C. for 4 hours in a nitrogen-containing atmosphere of nitrogen and hydrogen at 9 atm. The nitrogenated green body was then sintered at 1950° C. for 4 hours in a nitrogen atmosphere at 9 atm with the green body buried in the following surface roughing inhibitor powder:

Example 31 100 wt. % $Si_3N_4$ powder,

Example 32 90 wt. % $Si_3N_4$+10 wt. % Si powder, and

Example 33 96.5 wt. % $Si_3N_4$+2.5 wt. % $Y_2O_3$+1.0 wt. % $Al_2O_3$.

The sintered samples were measured with respect to density, bending strength at room temperature and Weibull coefficient. The results are shown in Table 16, in which "n" indicates the number of samples. In Examples 32 and 33, the Weibull coefficient was not calculated according to JIS R1601 because the number of samples "n" were less than 10.

Comparative Example 15

The sintered sample was prepared in the same manner as in Example 31 except for sintering without surface roughing inhibitor powder. The sintered samples were measured with respect to density, bending strength at room temperature and Weibull coefficient. The results are shown in Table 16.

TABLE 16

| | Properties of Sintered Body | | |
|---|---|---|---|
| No. | Relative Density (%) | Bending Strength (MPa)(1) | Weibull Coefficient |
| Example | | | |
| 31 | 96 | 394 (n = 20) | 18 (n = 20) |
| 32 | 96 | 415 (n = 8) | — |
| 33 | 96 | 402 (n = 8) | — |
| Comparative Example | | | |
| 15 | 96 | 275 (n = 20) | 14 (n = 20) |

Note
(1)At a room temperature.

Figure 29:
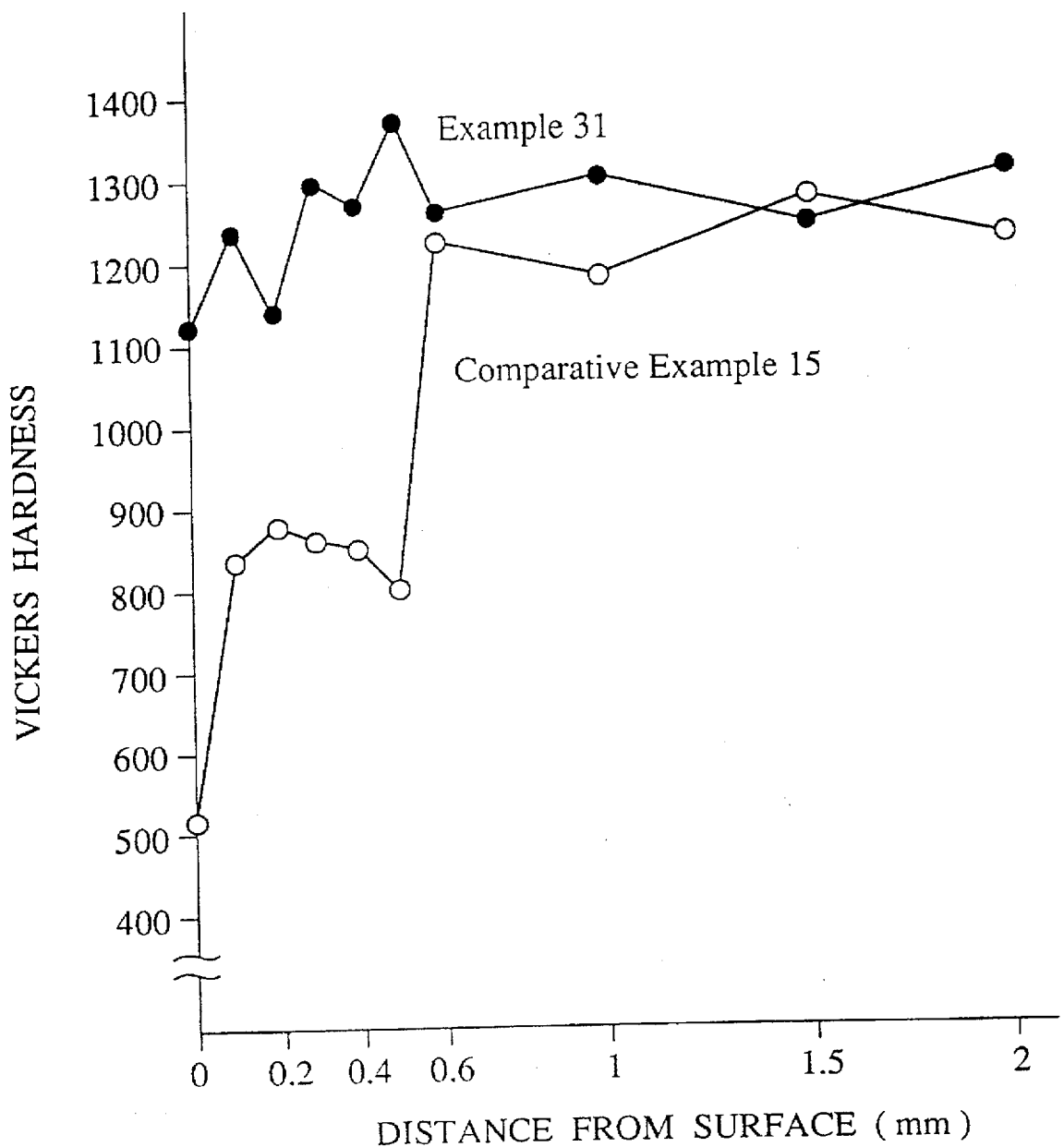
FIG. 29 is a graph showing the Vickers hardness of a surface area of the sintered body in Example 31 and Comparative Example 15.

FIG. 29 is a graph showing a surface hardness of the sintered samples of Example 31 in comparison with those of Comparative Example 15. As noted from FIG. 29, the sintered sample of Example 31 does not exhibit any deterioration in surface hardness while that of Comparative Example 15 exhibits a considerable deterioration in a hardness of a surface portion.

EXAMPLES 34, 35

Two types of silicon powder having the following particle size distribution ranges were fully mixed with silicon nitride powder and sintering aid powder by ball milling.

Silicon powder 1 (average particle size: 33 μm): 60.5 weight %(1),

Silicon powder 2 (average particle size: 3 μm): 26.0 weight %(1), $Si_3N_4$ powder (average particle size: 3 μm): 10.0 weight %, $Y_2O_3$ powder (average particle size: 3 μm): 2.5 weight %, and Al$_2$O$_3$ powder (average particle size: 3 μm): 1.0 weight %.

Note: (1) In terms of Si$_3$N$_4$.

Figure 30:
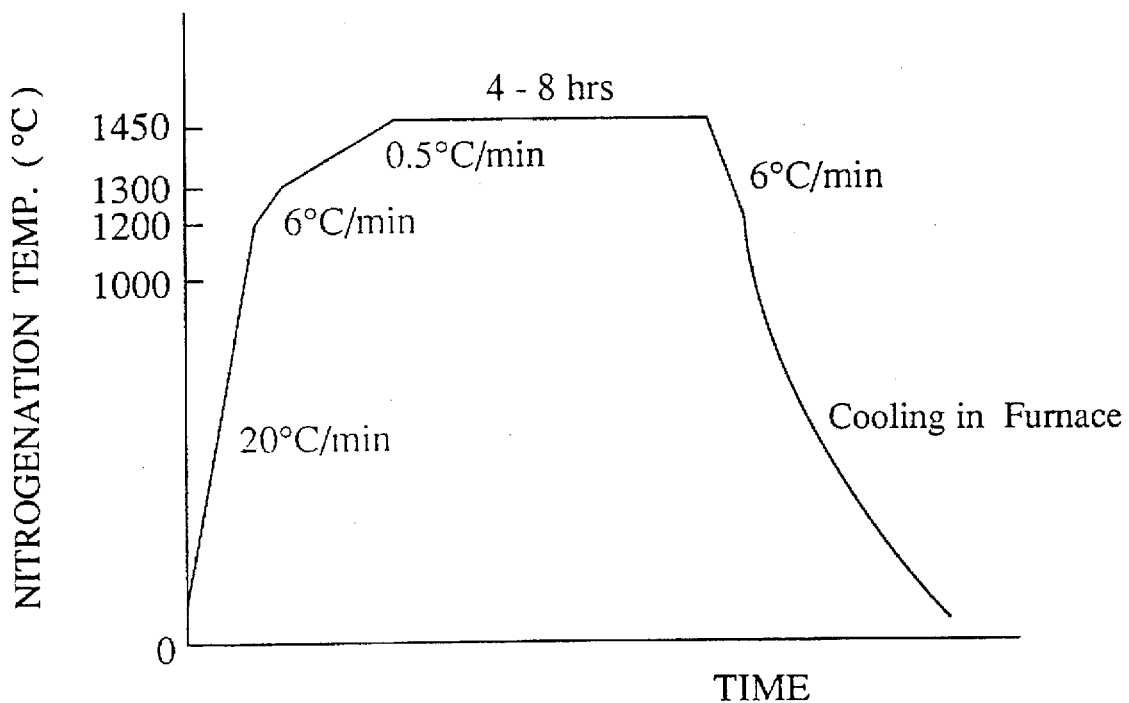
FIG. 30 is a graph showing the nitrogenation temperature pattern in Examples 34 and 35.
Figure 31:
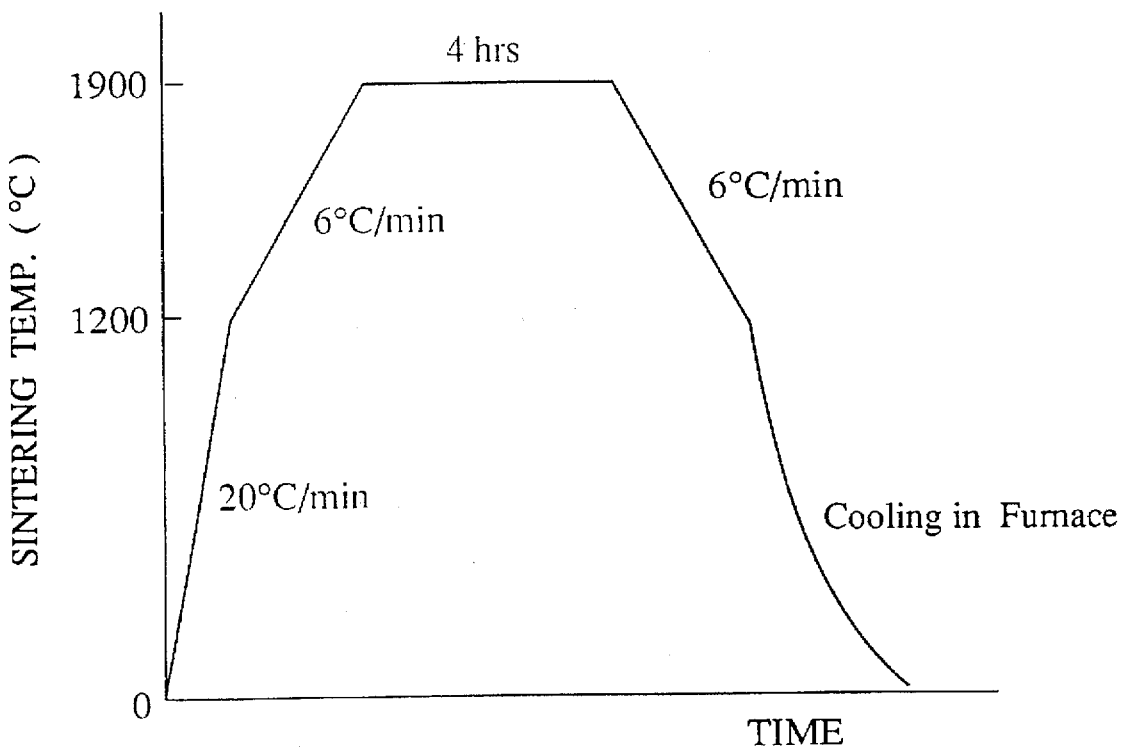
FIG. 31 is a graph showing the sintering temperature pattern in Examples 34 and 35.

The powder mixture was preliminarily compressed in a die, and the resultant preliminary green body was subjected to a cold isostatic pressing (CIP) to form a green body. Next, according to the temperature pattern shown in FIG. 30, in which the abscissa indicates a lapsed time and the ordinate indicates a nitrogenation temperature, it was heated at 1450° C. for 4 hours in an atmosphere of 90 volume % of nitrogen and 10 volume % of hydrogen (Example 34) or in an atmosphere of 100 volume % of nitrogen (Example 35) for nitrogenation. The nitrogenated green body was sintered according to the temperature pattern shown in FIG. 31 in a nitrogen gas (pressure: 8.5 kg/cm$^2$ at room temperature and 90 kg/cm$^2$ at 1900° C.). The resultant sintered body was measured with respect to nitrogenation degree, α ratio and three-point bending strength. The results are shown in Table 17.

TABLE 17

| Example No. | Nitrogenation Gas[2] | Nitrogenation Degree (%)[2] | α Ratio[3] | Strength (MPa)[1] at Room Temp. | at 1300° C. |
|---|---|---|---|---|---|
| 34 | 90/10 | 89 | 0.65 | 508 | 438 |
| 35 | 100/0 | 92 | 0.46 | 271 | 260 |

Note:
[1] Three-point bending strength according to JIS R 1601.
[2] Nitrogen/hydrogen ratio (volume %).
[3] α/(α + β).

The sintered body of Example 34 nitrogenated in the N$_2$ (90%)/H$_2$ (10%) atmosphere had a nitrogenation degree of 89% and an α ratio of 0.65. In Example 35 nitrogenated in a 100-% N$_2$ atmosphere, the nitrogenation degree was 92% and the α ratio was 0.46.

Figure 32:
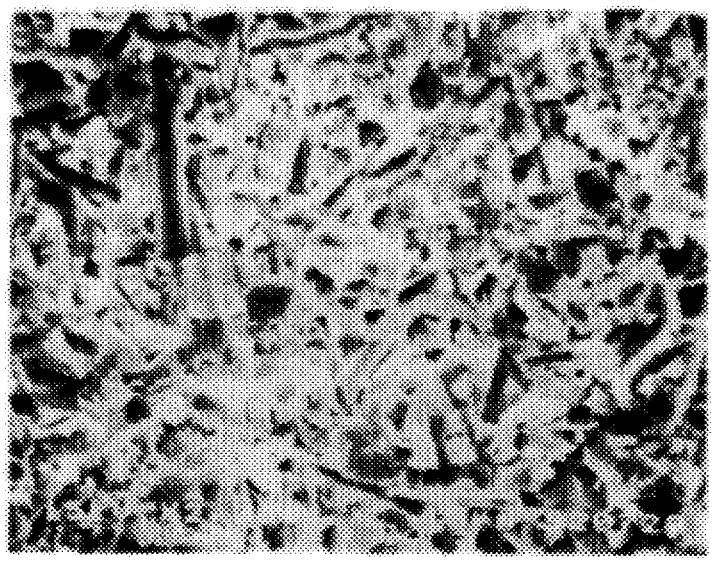
FIG. 32(a) is a photomicrograph showing the crystal grain structure of the sintered body in Example 34.
FIG. 32(b) is a photomicrograph showing the crystal grain structure of the sintered body in Example 35.
Figure 32:
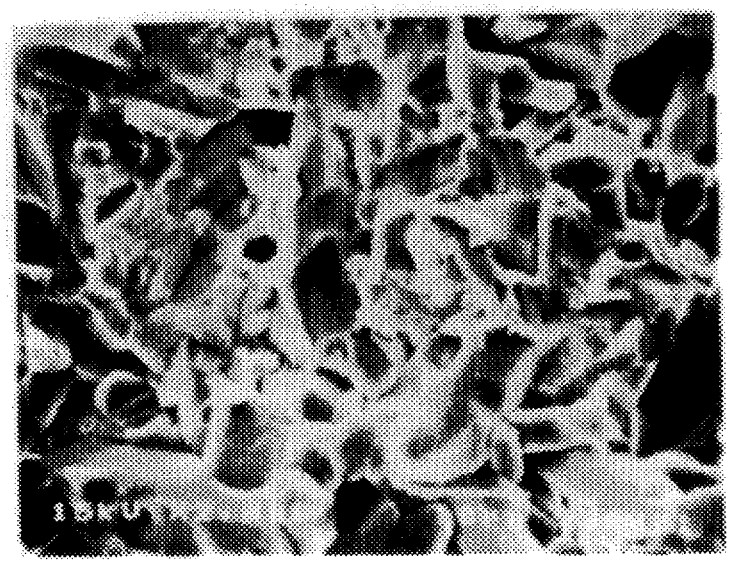

FIGS. 32(a) and (b) are photomicrographs (magnification: 2000) showing the grain structures of the sintered bodies of Examples 34 and 35. As noted from FIG. 32(a), the sintered body of Example 34 had a very fine and dense structure containing a lot of needle-like crystals each having a length of 10 μm to 20 μm and a diameter of 2 μm to 3 μm. On the other hand, the sintered body of Example 35 had less grown needle-like crystals as is clear from FIG. 32(b).

Figure 33:
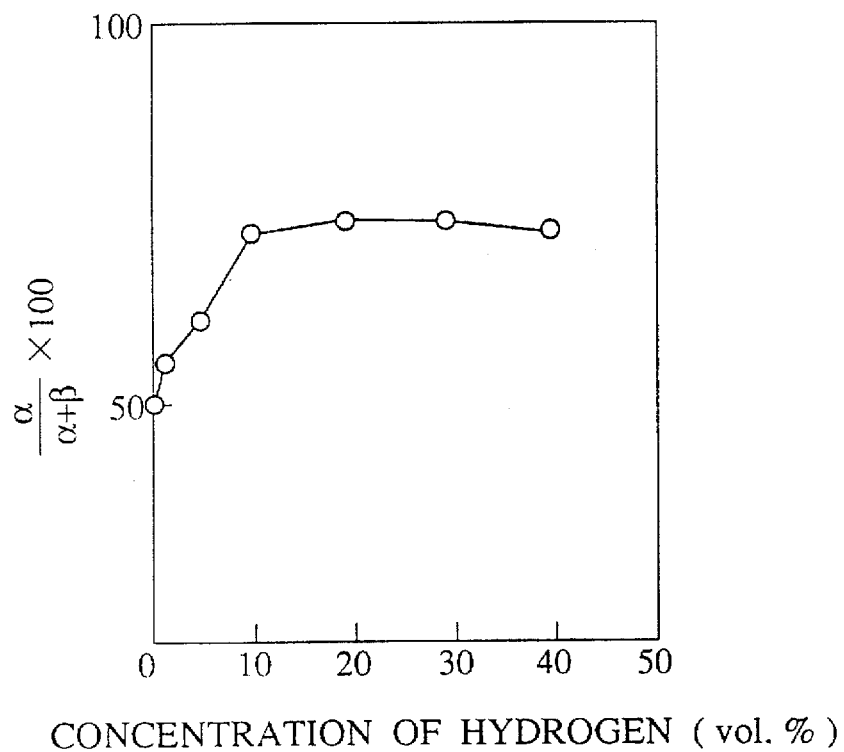
FIG. 33(a) is a graph showing the relation between a hydrogen concentration of a sintering atmosphere and the proportion of an $\alpha\text{-}Si_3N_4$ phase in the sintered body.
FIG. 33(b) is a graph showing the relation between a hydrogen concentration of a sintering atmosphere and the amount of residual silicon in the sintered body.
Figure 33:
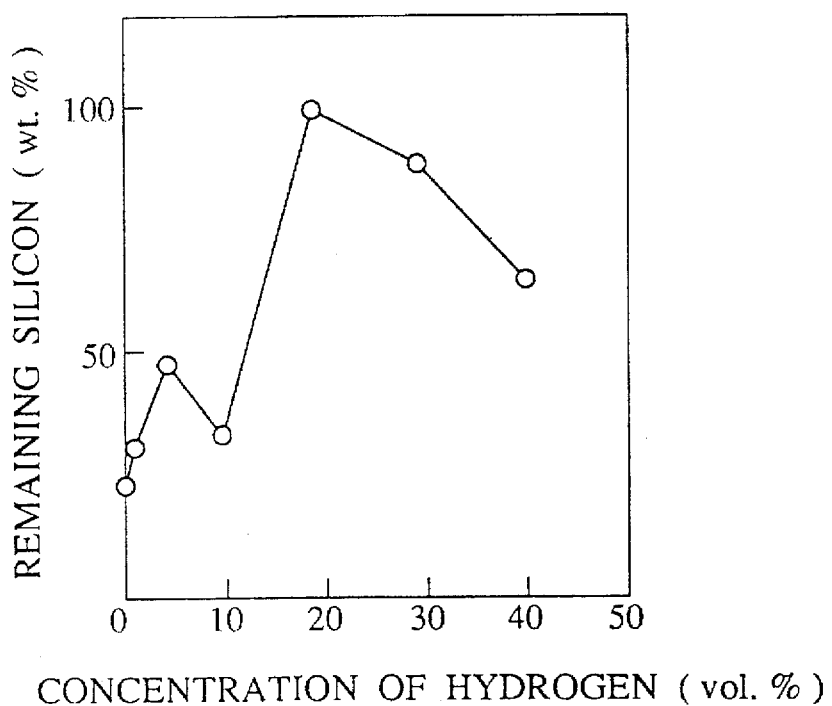

To investigate the influence of the concentration of a hydrogen gas in the nitrogenation atmosphere, the green body was nitrogenated and sintered in the same manner as described above in a nitrogen atmosphere containing up to 50 volume % of H$_2$ and measured with respect to the amount of residual silicon and an α ratio. The results are shown in FIGS. 33(a) and 33(b). As noted from FIG. 33(a), the α ratio increases with the H$_2$ content in the H$_2$ range of up to 10%, and levels off at the H$_2$ content of 20%. Also, as noted from FIG. 33(b), tile amount of the residual silicon is as small as 5 weight % or less when the H$_2$ content is up to 10%, and it largely increases when the H$_2$ content exceeds 20%. Accordingly, the hydrogen concentration of the nitrogenation atmosphere is 20% or less, preferably about 10–20% to effectively form α-Si$_3$N$_4$ and to reduce the amount of silicon remaining in the sintered body.

EXAMPLE 36

368.6 g of Si powder, 78.8 g of Y$_2$O$_3$ powder and 97.1 g of Si$_3$N$_4$ powder were introduced into a 500-ml polyethylene ball mill pot. Further added to the pot were 562 g of ethanol and 562 g of a ball. The mixture was ball-milled for 18 hours and then dried by a rotary evaporator. The resultant powder mixture was charged into dies for an outer nozzle member 44, an inner nozzle member 46 and nozzle vanes 48a–48h as shown in FIGS. 14(a) and 14(b) and compressed for 1 minute at 4000 kg/cm$^2$ for the outer nozzle member 44 and at 2000 kg/cm$^2$ for the inner nozzle member 46 and the nozzle vanes 48a–48h.

Added to a solution of 50 weight % of water and 50 weight % of ethanol was 0.5 weight % of polyvinyl alcohol based on the total weight of the solution to form a binder liquid. The liquid was then mixed with 92.5 weight % (in terms of Si$_3$N$_4$) of silicon powder and 7.5 weight % of Y$_2$O$_3$ powder, ball-milled, and dried by a rotary evaporator in the same manner as above to prepare a binder material.

With the binder material prepared above, the molded nozzle vanes 48a–48h were integrally bonded to an outer surface of the inner nozzle member 46 as shown in FIG. 14(b). The other ends of the nozzle vanes 48a–48h were then bonded to an inner surface of the outer nozzle member 44 with the binder material to produce an integral green body (composite body).

Figure 26:
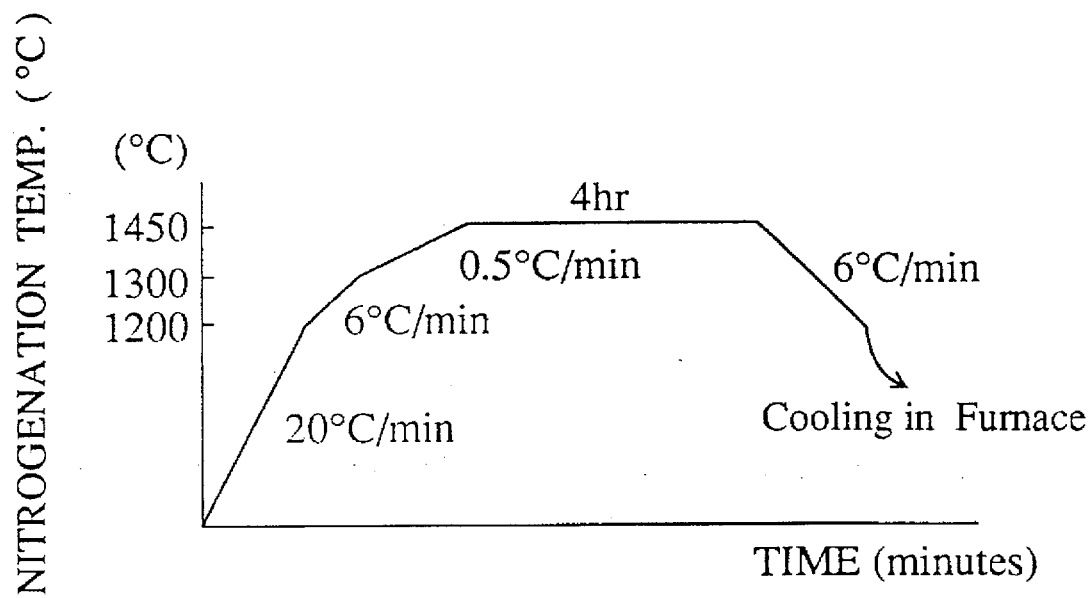
FIG. 26 is a graph showing the nitrogenation temperature pattern for a green body in Example 36.

The integral green body thus produced was put into a boron nitride crucible and nitrogenated according to a temperature and pressure program shown in FIG. 26 which started with an initial pressure of 45 kg/cm$^2$ followed by (a) heating at 20° C./minute to 1200° C., (b) heating at 6° C./minute to 1300° C., (c) heating at 0.5° C./minute from 1300° C. to 1450° C., (d) keeping at 1450° C. for 4 hours at an N$_2$ gas pressure of 90 kg/cm$^2$, (e) cooling at 6° C./minute to 1200° C., and then (f) cooling in a furnace.

Figure 27:
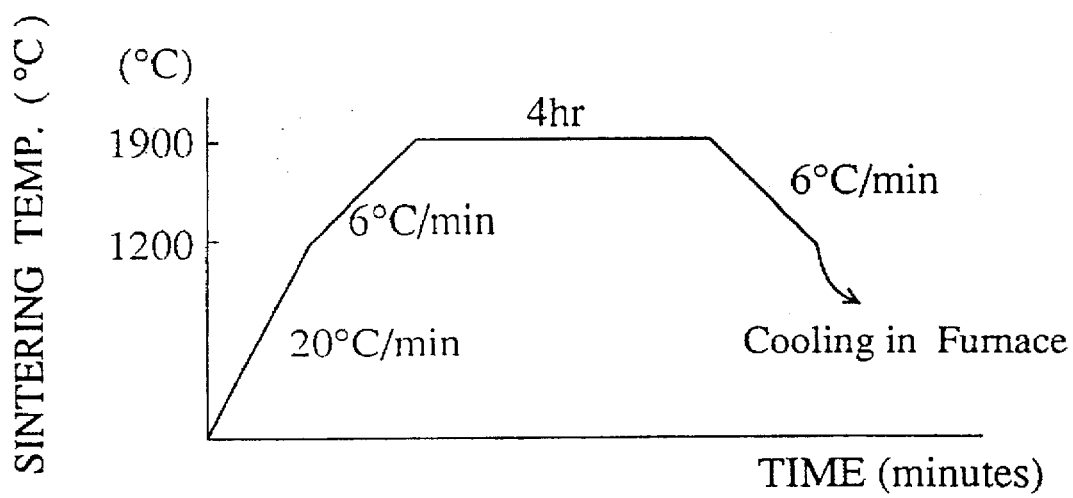
FIG. 27 is a graph showing the sintering temperature for a nitrogenated green body in Example 36.

The nitrogenated green body was then sintered in a boron nitride crucible according to a temperature and pressure program shown in FIG. 27 which started with (a) heating at 20° C./minute to 1200° C. at an N$_2$ gas pressure of 3.5 kg/cm$^2$ followed by (b) heating at 6° C./minute to 1900° C., (c) keeping at 1900° C. for 4 hours at an N$_2$ gas pressure of 9.0 kg/cm$^2$, (d) cooling at 6° C./minute to 1200° C., and then (e) cooling in a furnace.

Figure 28:
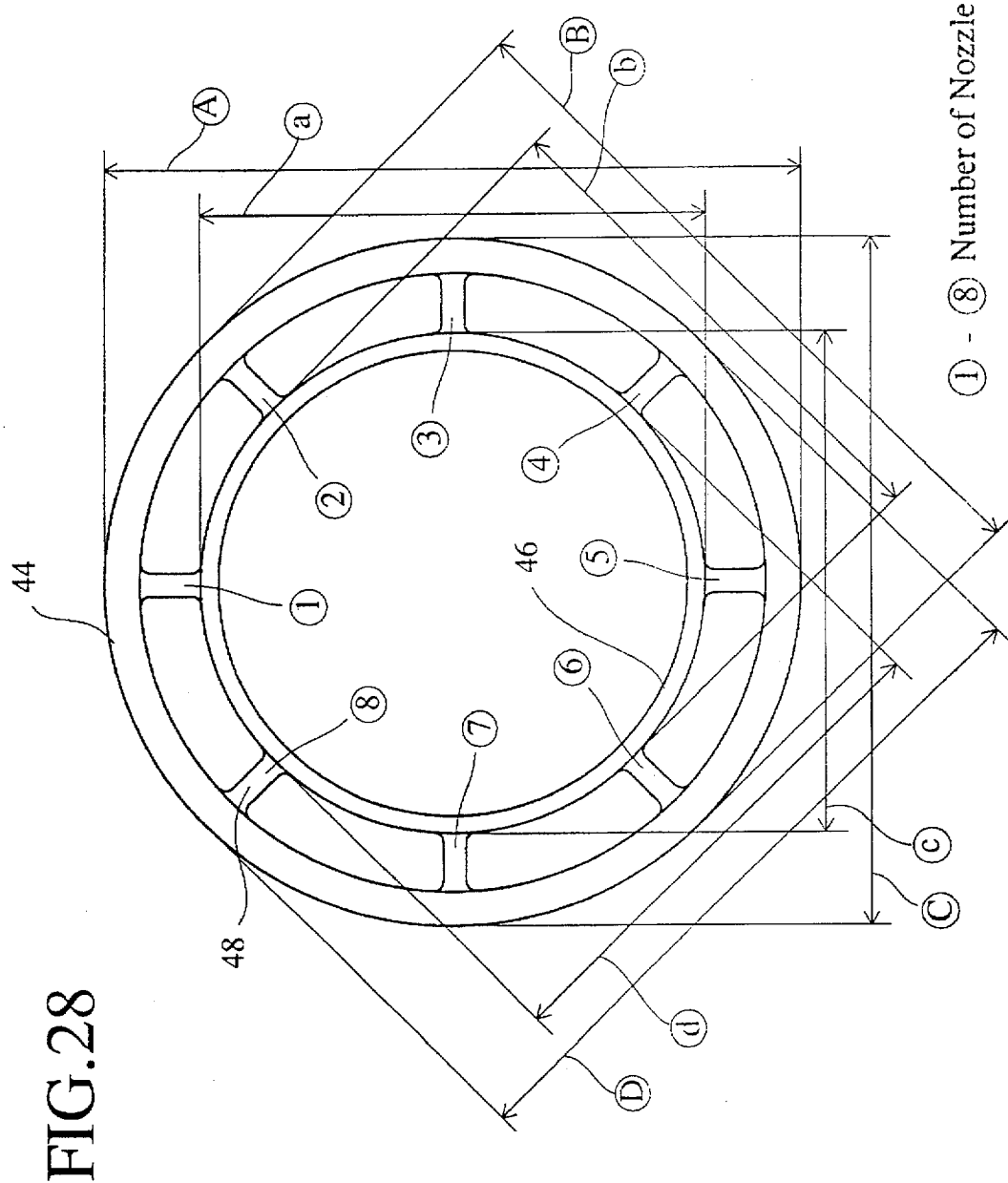
FIG. 28 is plan view showing the nozzle member in Example 36, in which points for measuring a sintering shrinkage are indicated.

To examine the sintering shrinkage of the resultant sintered body, the diameters of the sintered outer nozzle member 44 and the sintered inner nozzle member 46 were measured at positions shown in FIG. 28 ("A"–"D" for the outer nozzle member 44 and "a"–"d" for the inner nozzle member 46). The measured diameters were divided by those measured at the same positions before sintering to determine the sintering shrinkage. The results are shown in Table 18.

TABLE 18

| Measured Position | | Shrinkage by Sintering (%) |
|---|---|---|
| A | Outer Nozzle | 2.71 |
| a | Inner Nozzle | 1.52 |
| B | Outer Nozzle | 2.51 |
| b | Inner Nozzle | 1.56 |
| C | Outer Nozzle | 3.46 |
| c | Inner Nozzle | 2.03 |
| D | Outer Nozzle | 3.16 |
| d | Inner Nozzle | 2.20 |

It is clearly understood from Table 18 that the sintering shrinkage of the outer nozzle member 44 is greater than that of the inner nozzle member 46 at all positions "A"–"D" and "a"–"d".

Table 19 shows the results of observations conducted on the nozzle vanes (1)–(8) bonded to the outer nozzle member 44. As noted from Table 19, no peelings and cracks were observed in any of the nozzle vanes (1)–(8).

TABLE 19

| No. of Nozzle Vane | Peeling | No. of Nozzle Vane | Peeling |
| --- | --- | --- | --- |
| 1 | No | 5 | No |
| 2 | No | 6 | No |
| 3 | No | 7 | No |
| 4 | No | 8 | No |

As described above in detail, the method of the present invention can provide silicon nitride reaction-sintered bodies with high dimensional accuracy due to small shrinkage by sintering. Such silicon nitride reaction-sintered bodies have good mechanical strength in an as-sintered state without subjected to surface working. Also, the method of the present invention can produce green bodies with complicated shapes without difficulty.

EXAMPLE 37

An injection molding process shown in FIG. 9 was conducted using the following ceramic materials:

Silicon powder (average particle size: 30 µm): 50.4 weight %[(1)],

Silicon powder (average particle size: 3 µm): 21.6 weight %[(1)], $Si_3N_4$ powder (average particle size: 0.3 µm): 13.3 weight %, $Y_2O_3$ powder (average particle size: 1.4 µm): 10.3 weight %, and AlN powder (average particle size: 2.0 µm): 4.4 weight %.

Note (1) Percentage is expressed in terms of $Si_3N_4$.

The resultant powder mixture was mixed with 80 weight % of ethanol and ball-milled for 18 hours. The ball-milled admixture was dried by a rotary evaporator and then blended with a wax binder having a composition of 68 weight % of paraffin (Pa-135), 16.5 weight % of LUVAX, 10.5 weight % of stearic acid and 5.0 weight % of a dispersant for 4 hours by a pressure kneader. The resultant blend was injection-molded at 6 kg/cm², and degreased at 300° C. for 3 hours in vacuum and then at 500° C. for 1 hour in the air. After degreasing, the green body was nitrogenated according to the temperature pattern shown in FIG. 26 in an atmosphere of 80% nitrogen and 20% hydrogen at 9 kg/cm², and then sintered according to the temperature pattern shown in FIG. 27. The degreased green body had a density of 1.85–2.0 g/cm³, and the sintered body had a density of 95.2% (based on a theoretical density). The sintering shrinkage was 4.6% from the degreased green body to the sintered body. The sintered body had a bending strength of 491 MPa at room temperature and 479 MPa at 1300° C.

What is claimed is:

1. A method for producing a silicon nitride reaction-sintered body comprising (1) forming into a green body a silicon powder mixture of at least two types of silicon powders having substantially independent particle size distribution ranges which do not substantially overlap each other, said silicon powder mixture having an average particle size ranging from 5 µm to 300 µm; (2) heating said green body in a nitrogen-containing atmosphere to nitrogenate said silicon powder mixture; and (3) sintering the green body of the nitrogenated silicon powder mixture at a temperature of 1900° C. or higher;

wherein said silicon powder mixture comprises a first silicon powder having a particle size between 10 µm and 80 µm and an average particle size ranging from 20 µm to 50 µm and a second silicon powder having a particle size between 1 and 20 µm and an average particle size ranging from 1 to 5 µm, such that said first and second silicon powders when mixed form a bimodal particle size distribution, and wherein said first and second powder are mixed at a weight ratio of 5:5 to 9:1.

2. The method according to claim 1, wherein 1–10 parts by weight of at least one sintering aid selected from the group consisting of $Y_2O_3$, $Al_2O_3$, $Yb_2O_3$, $HfO_2$ and IIIa elements in the Periodic Table is mixed with 100 parts by weight of said silicon powder mixture.

3. The method according to claim 1, wherein said sintering step is carried out on said nitrogenated green body buried in a powdery surface roughing inhibitor.

4. The method according to claim 3, wherein said powdery surface roughing inhibitor comprises silicon powder and sintering aid powder.

5. The method according to claim 4, wherein said powdery surface roughing inhibitor further comprises silicon nitride powder.

6. A method for producing a silicon nitride reaction-sintered body comprising the steps of (1) preparing a silicon powder mixture of at least two types of silicon powders having substantially independent particle size distribution ranges which do not substantially overlap each other, said silicon powder mixture having an average particle size ranging from 5 µm to 300 µm; (2) mixing said silicon powder mixture with a sintering aid including $Y_2O_3$ and at least one component selected from the group consisting of MgO, $CeO_2$, BeO, AlN, $La_2O_3$, $ZrO_2$, Fe and $Fe_2O_3$; (3) forming a mixture of said silicon powder mixture and said sintering aid into a green body; (4) heating said green body at a temperature of lower than 1500° C. in a nitrogen-containing atmosphere to nitrogenate said silicon powder mixture; and (5) sintering the green body of the nitrogenated silicon powder mixture at a temperature ranging from 1500° C. to 1800° C.;

wherein said silicon powder mixture comprises a first silicon powder having a particle size between 10 µm and 80 µm and an average particle size ranging from 20 µm to 50 µm and a second silicon powder having a particle size between 1 and 20 µm and an average particle size ranging from 1 to 5 µm, such that said first and second silicon powders when mixed form a bimodal particle size distribution, and wherein said first and second powder are mixed at a weight ratio of 5:5 to 9:1.

7. The method according to claim 6, wherein said sintering aid is a combination of $Y_2O_3$, $Al_2O_3$, and at least one component selected from the group consisting of MgO, $CeO_2$, BeO, AlN, $La_2O_3$, $ZrO_2$, Fe and $Fe_2O_3$.

8. The method according to claim 6, wherein said sintering step is carried out on said nitrogenated green body buried in a powdery surface roughing inhibitor.

9. The method according to claim 6, wherein said powdery surface roughing inhibitor comprises silicon powder and sintering aid powder.

10. The method according to claim 9, wherein said powdery surface roughing inhibitor further comprises silicon nitride powder.

11. A method for producing a silicon nitride reaction-sintered body comprising the steps of (1) mixing a silicon powder mixture of at least two types of silicon powders having substantially independent particle size distribution ranges which do not substantially overlap each other with a sintering aid powder and a wax binder, said silicon powder mixture having an average particle size ranging from 5 µm to 300 µm; (2) injection-molding the resultant mixture into a green body; (3) degreasing said green body; (4) nitrogenating the degreased green body in a nitrogen-containing atmosphere; and (5) sintering the nitrogenated green body at 1900° C. or higher;

wherein said silicon powder mixture comprises a first silicon powder having a particle size between 10 µm and 80 µm and an average particle size ranging from 20 µm to 50 µm and a second silicon powder having a particle size between 1 and 20 µm and an average particle size ranging from 1 to 5 µm, such that said first and second silicon powders when mixed form a bimodal particle size distribution, and wherein said first and second powder are mixed at a weight ratio of 5:5 to 9:1.

12. The method according to claim 11, wherein the total of said silicon powder mixture and said sintering aid powder is 50–80 volume %, and said binder is 50–20 volume %.

13. The method according to claim 11, wherein said binder contains maleinized wax.

\* \* \* \* \*